United States Patent [19]

Hiratsuka et al.

[11] Patent Number: 4,980,760
[45] Date of Patent: Dec. 25, 1990

[54] IMAGE PROCESSING APPARATUS

[75] Inventors: Seiichiro Hiratsuka; Koji Washio; Hiroyuki Yamamoto; Masahiko Matsunawa, all of Hachioji, Japan

[73] Assignee: Konica Corporation, Tokyo, Japan

[21] Appl. No.: 303,491

[22] Filed: Jan. 27, 1989

[30] Foreign Application Priority Data

Jan. 29, 1988 [JP] Japan .................................. 63-19321

[51] Int. Cl.⁵ .............................................. G03F 3/08
[52] U.S. Cl. ...................................... 358/80; 358/905
[58] Field of Search ...................... 358/75, 78, 80, 29, 358/29 C, 27, 905

[56] References Cited

U.S. PATENT DOCUMENTS

| 4,580,889 | 4/1986 | Hiranuma et al. | 358/75 |
| 4,727,424 | 2/1988 | Chao | 358/905 |

FOREIGN PATENT DOCUMENTS

| 59-128872 | 7/1984 | Japan . |
| 59-163980 | 9/1984 | Japan . |
| 60-160774 | 8/1985 | Japan . |
| 63-10884 | 1/1988 | Japan . |
| 63-10885 | 1/1988 | Japan . |
| 63-10886 | 1/1988 | Japan . |
| 63-10887 | 1/1988 | Japan . |

*Primary Examiner*—Edward L. Coles, Sr.
*Assistant Examiner*—Jerome Grant, II
*Attorney, Agent, or Firm*—Frishauf, Holtz, Goodman & Woodward

[57]  ABSTRACT

An image processing apparatus includes an image data forming unit for forming density data corresponding to each of a plurality of color components including an achromatic color and color data for discriminating a chromatic color portion from an achromatic color portion of an image, the density data and the color data being formed in units of pixels on the basis of original image information, a density data selector for selecting one of a plurality of density data output from the image data forming unit, color ghost correction for unit for changing the color data of a pixel when a serial arrangement of color data of a plurality of successive pixels including the pixel coincides with one of a plurality of predetermined patterns.

6 Claims, 23 Drawing Sheets

YELLOW GHOST AREA    CYAN GHOST AREA

YELLOW   BLACK   CYAN

FIG. 11

| CASE | COLOR PATTERN | PIXEL OF INTEREST |
|---|---|---|
| 1 | W W W CHR B B B | CHR → B |
| 2 | W W CHR CHR CHR W W | CHR → CHR |

PERIPHERAL PIXELS / PERIPHERAL PIXELS

FIG. 12

| N | M | NO. OF COLOR PATTERN | PATTERN SIZE |
|---|---|---|---|
| 2 | 3 | 8 | 1 x 3 |
|  | 5 | 32 | 1 x 5 |
|  | 7 | 128 | 1 x 7 |
| 3 | 3 | 27 | 1 x 3 |
|  | 5 | 243 | 1 x 5 |
|  | 7 | 2187 | 1 x 7 |
| 4 | 3 | 64 | 1 x 3 |
|  | 5 | 1024 | 1 x 5 |
|  | 7 | 16384 | 1 x 7 |
|  | 9 | 262144 | 3 x 3, 1 x 9 |

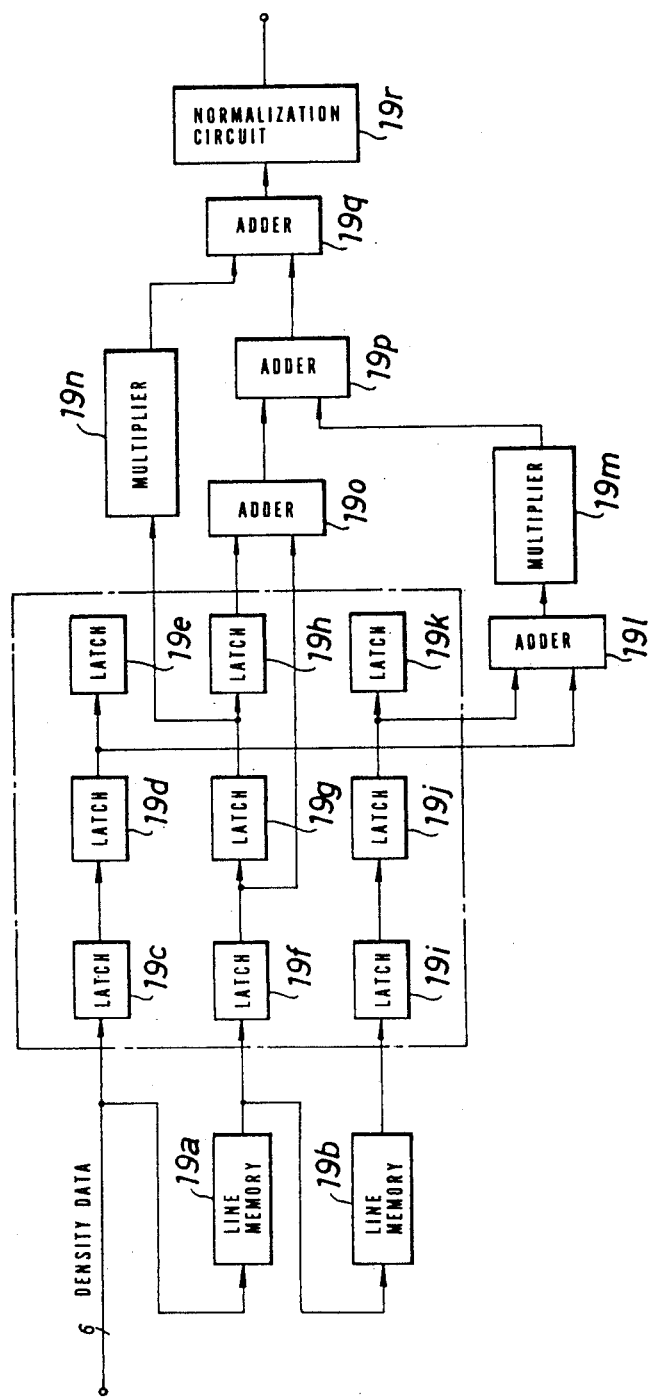
F I G. 18

F I G. 19

| 1 | 2 | 5 | 10 |
|---|---|---|---|
| 3 | 4 | 6 | 11 |
| 7 | 8 | 9 | 12 |
| 13 | 14 | 15 | 16 |

| 17 | 18 | 21 | 26 |
|---|---|---|---|
| 19 | 20 | 22 | 27 |
| 23 | 24 | 25 | 28 |
| 29 | 30 | 31 | 32 |

| 33 | 34 | 37 | 42 |
|---|---|---|---|
| 35 | 36 | 38 | 43 |
| 40 | 41 | 39 | 44 |
| 45 | 46 | 47 | 48 |

OPERATION DISPLAY UNIT

IMAGE PROCESSING APPARATUS

BACKGROUND OF THE INVENTION

1. Field of the Invention

The present invention relates to an image processing apparatus used in a copying machine or a facsimile system and, more particularly, to an image processing apparatus having a color ghost correction function and capable of processing with high quality a black character or the like included in a color image.

2. Description of the Prior Art

A conventional image processing system comprises an image reading unit for reading a document image and converting the document image into red (R), green (G), and blue (B) image signals, a means for color-correcting (converting) these R, G, and B signals into Y (yellow), M (magenta), and C (cyan) signals, an undercolor removing means for extracting achromatic components from the Y, M, and C signals and generating a K (black) signal, a multi-value converting means for converting the Y, M, C, and K signals into multi-value signals, and an image recording unit for producing a hard copy of the document in accordance with the multi-value Y, M, C, and K signals.

The document image is converted into the R, G, and B signals by the image reading unit. The R, G, and B signals are color-corrected into the Y, M, and C signals representing complementary colors of the colors represented by the R, G, B signals. An image is finally recorded by the Y, M, and C toners. When all colors are expressed by the Y, M, C colors, a lack of density in a high-density portion (black or the like) of an achromatic color tends to occur. For this reason, equivalent achromatic components are extracted from the Y, M, and C signals by the undercolor removing means, and the black (K) signal is generated (undercolor removal or UCR). In order to provide sufficient gradation levels to the image recording apparatus, the Y, M, C, and K signals are converted into multi-value (2 to 8 values) signals. In a normal operation, an image requires 32 or more gray scale levels. For this reason, a dither method or the like is combined with an area gradation method to perform multi-value conversion for gradation expressions. The multi-value Y, M, C, and K signals are output as an image from the image recording apparatus.

When a reading unit for reading a document by photoelectric transducer elements and simultaneously producing B, G, and R signals is used as an image data input means, positional errors of light incident on the photoelectric transducer elements occur by color separation beams due to various causes in an optical system. As a result, a color ghost is formed in a recorded image. In the color ghost phenomenon, edge portions of a black character or figure are output as chromatic portions, and image quality is therefore degraded. It is possible to predict appearance of a color ghost to some extent from dot patterns and the like of the output image. In this case, however, it must be determined whether a dot of the output image is black. In addition, dot patterns must be stored in a memory. In order to realize this, a circuit arrangement becomes bulky and complicated.

SUMMARY OF THE INVENTION

It is an object of the present invention to provide an image processing apparatus having a simple circuit arrangement and capable of performing color ghost correction processing and reproducing with high quality a black character or the like included in a color image.

In order to achieve the above object of the present invention, there is provided an image processing apparatus comprising image data forming means for forming density data corresponding to each of a plurality of color components including an achromatic color and color data for discriminating a chromatic color portion from an achromatic color portion of an image, the density data and the color data being formed in units of pixels on the basis of original image information, density data selecting means for selecting one of a plurality of density data output from the image data forming means, and image data resetting means for resetting the color data and the density data selected by the density data selecting means when the color data of a plurality of successive pixels represents a specific pattern.

According to the present invention, color data (to be also referred to as a color code hereinafter) representing whether each pixel represents black is generated, and a color ghost is detected on the basis of the color data. Processing is performed to eliminate a color ghost of a given pixel when the color ghost of the given pixel is detected. Image data free from a color ghost is formed and output to the recording unit.

BRIEF DESCRIPTION OF THE DRAWINGS

FIGS. 11 and 12 are views for explaining color ghost correction;

FIG. 18 is a block diagram of an MTF correction circuit;

FIG. 19 is view showing patterns of a dither matrix;

DETAILED DESCRIPTION OF THE PREFERRED EMBODIMENTS

Preferred embodiments of the present invention will be described with reference to the accompanying drawings.

Figure 1:
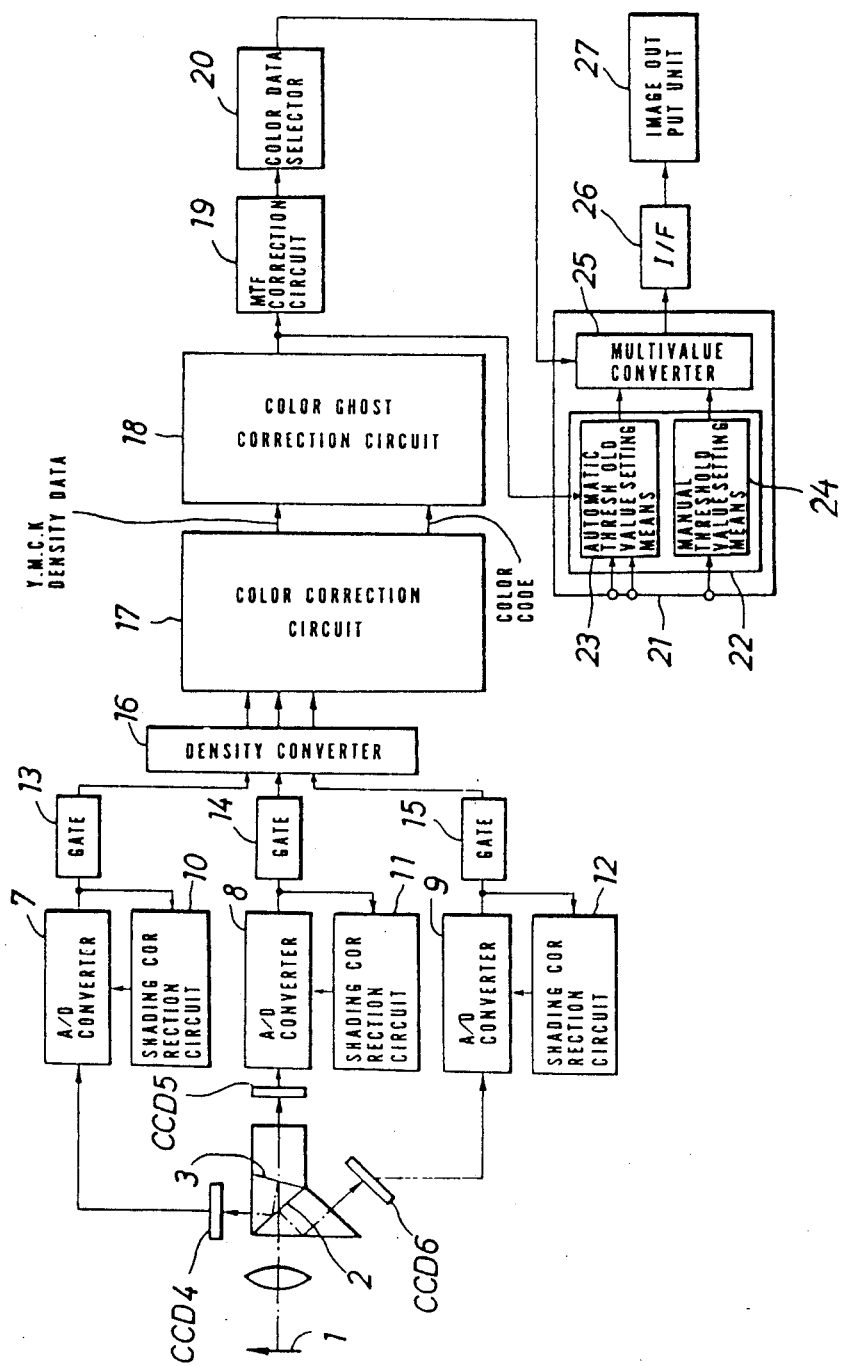
FIG. 1 is a block diagram of a color image processing apparatus according to an embodiment of the present invention.

FIG. 1 is a schematic block diagram showing an arrangement of an image processing apparatus according to an embodiment of the present invention.

Color image data (optimal image) of a document 1 is separated into three color-separated images by two dichroic mirrors 2 and 3. In this embodiment, the color image is separated into a red (R) color-separated image, a green (G) color-separated image, and a blue (B) color-separated image. A cutoff wavelength of the dichroic mirror 2 falls within the range of about 450 to 520 nm, while a cutoff wavelength of the dichroic mirror 3 falls within the range of about 550 to 620 nm. Therefore, a green component serves as a transmission beam, a blue component serves as a first reflection beam, and a red component serves as a second reflection beam.

The red (R), green (G), blue (B) color-separated images are supplied to an image reading means such as CCD sensors 4, 5, and 6, respectively. The CCD sensors 4, 5, and 6 output red component (R), green component (G), and blue component (B) image signals, respectively.

The image signals R, G, and B are supplied to A/D converters 7, 8, and 9, respectively, and are converted into signals each having a predetermined number of bits (e.g., 8 bits). The image signals are also subjected to shading correction. Reference numerals 10, 11, and 12 denote shading correction circuits, respectively. Shading correction will be described in detail later.

Only maximum document size signal components of shading-corrected digital image signals are extracted by gate circuits 13, 14, and 15 and are supplied to a color correction circuit 17 through a density converter 16. The density converter 16 reduces a volume of data at the time of color correction in consideration of a human visual sense. When a maximum document width is an A3 size, a size signal A3 generated by a timing signal forming means (not shown) in the system is used as the gate signal.

If the shading-corrected digital image signals are defined as VR, VG, and VB, the image signals VR, VG, and VB are supplied to the color correction circuit 17 and are converted into color signals for an image output unit.

In this embodiment, colors of the image output unit are defined as Y (yellow), M (magenta), K (black), and C (cyan).

Each converted color signal consists of density data (6-bit data) representing density information of Y, M, C, or K and color code data (2-bit data) representing color information of black, white or a chromatic color. These color signal data are stored in a color correction LUT comprising, e.g., a ROM.

The color-corrected image data are then processed in color image processing.

The color code data is supplied to a color ghost correction circuit 18, so that a color ghost is corrected by 7×1 pixels in a main scan direction (horizontal scan direction) and 1×7 pixels in a subscan direction (drum rotational direction).

The above correction is performed because an unnecessary color ghost is formed during color separation, and especially, color ghost areas are formed at the edges of a black character. Image quality can be improved by eliminating the color ghost. Color ghost processing is performed for only color code data.

Image processing operations include resolution correction, and threshold value correction for multi-value conversion in addition to color ghost correction.

The image processing operations also include enlargement/reduction processing and the like, but are exemplified by the above two operations.

Reference numeral 19 denotes an MTF correction circuit for performing resolution correction. Resolution correction is edge correction, and image data subjected to resolution correction is density data.

A color data selector 20 receives a processing designation signal for designating which image processing operation such as an area designation operation is designated on the display/operation unit and a Y, M, C, and K signals representing colors to be output. The color data selector 20 selects whether resolution-corrected density data is output to a multi-value converter 21 on the basis of these signals and the above-mentioned input signal.

For example, in a simple copy made, when only an image having the same colors as those represented by the Y, M, C, and K signals is output and an entire document is subjected to color conversion, i.e., when magenta is converted into cyan and cyan is converted into magenta, magenta image data is output at the time of recording with cyan and cyan image data is output at the time of recording with magenta.

Image data (density data) output from the color data selector 20 is converted into multi-value data by the multi-value converter 21. In this embodiment, the 6-bit density data is converted into 2-bit data (four-value data) of 0 to 3. Threshold value data (six bits) serving as the reference for four-value conversion can be manually or automatically set.

A threshold value selector 22 comprises a manual threshold value setting means 24 for manually setting the threshold value data, and an automatic threshold value setting means 23 for automatically setting the threshold value data. The manual threshold value setting means 24 can manually set threshold values in units of colors. Externally designated threshold values are output, and binary processing is performed on the basis of these threshold values.

The automatic threshold value setting means 23 comprises a ROM which stores predetermined threshold values In a normal state, the threshold value selector 22 is set in an automatic mode (EE mode). The threshold value selector 22 is switched to a manual mode in response to an external signal. The threshold value selector 22 receives the Y, M, C, and K signals which represent the colors to be selected in the current sequence.

The 4-value converted image data from the multi-value converter 25 are supplied to an image output unit 27 through an interface circuit 26. The interface circuit 26 comprises first and second interfaces. One interface is used to control a toner density, while the other interface is used to receive patch image data or the like.

The image output unit 27 comprises a laser recording unit or the like. When the laser recording unit is used, the 4-value image is converted into an optical signal having a predetermined band, and this optical signal is modulated on the basis of 4-value data.

A developing unit is the one used in an electrophotographic color copying machine. In this embodiment, 2-component non-contact reversal development is employed. A transfer drum used in conventional color image formation is not used, but images overlap on an electrophotographic photosensitive drum on which an image is formed. In this embodiment, in order to achieve compactness of the apparatus, yellow, magenta, black, and cyan toner images are formed on an image formation OPC photosensitive body (drum) by four revolutions. After four-color development is completed, the drum is rotated by one revolution to transfer the developed image to a recording sheet such as a normal paper sheet.

Components of the color image processing apparatus according to the present invention will be described in detail below.

Figure 2:
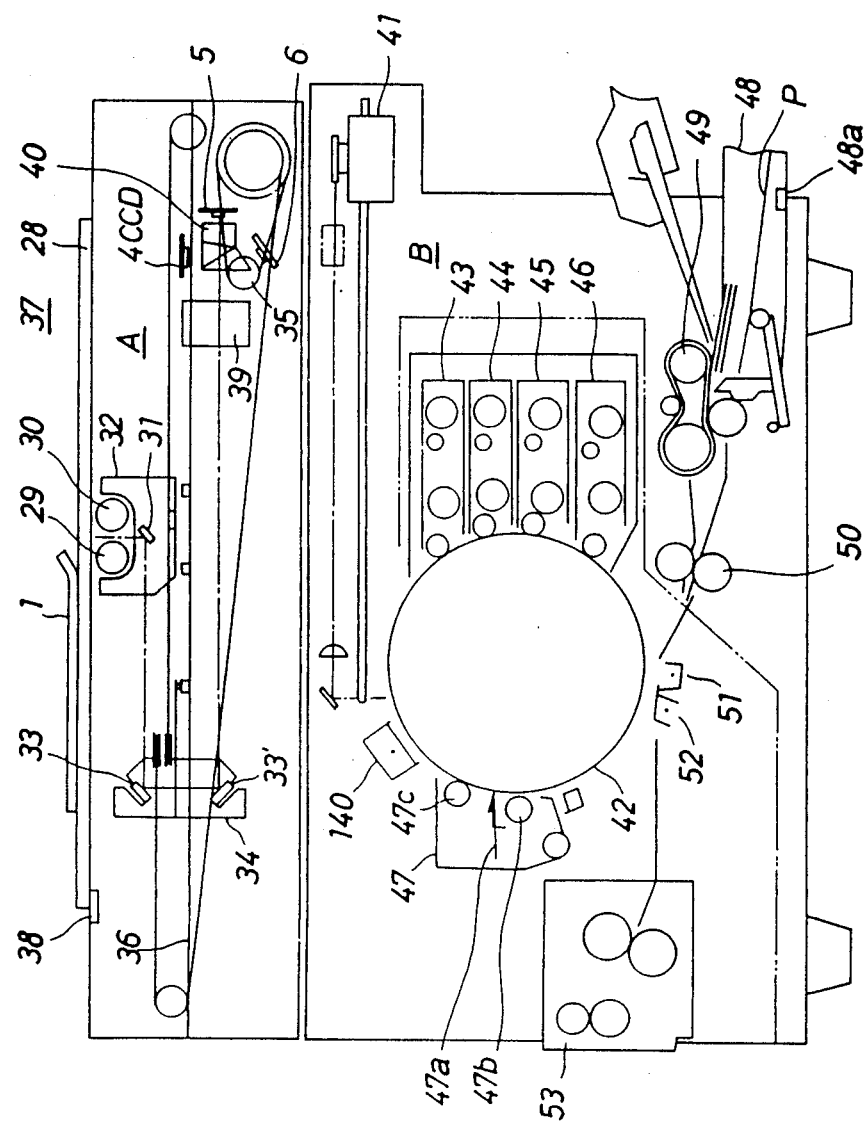
FIG. 2 is a view showing a main part of a color copying machine which can be applied to the present invention.

A full-color copying machine will be described with reference to the accompanying drawings from FIG. 2.

The full-color copying machine generates four color data, i.e., yellow, magenta, black, and cyan data and records a full-color image on a paper sheet.

Upon depression of a copy button of the apparatus, a document reading unit A is driven.

The document 1 on a document table 28 is scanned by an optical system.

The optical system includes a carriage 32 on which fluorescent lamps 29 and 30 and a reflecting mirror 31 are mounted, and a movable mirror unit 34 having V mirrors 33 and 33'.

The carriage 32 and the movable unit 34 are driven by a stepping motor 35 along slide rails 36 at a predetermined speed in a predetermined direction.

Optical information (image information) obtained upon radiation of the document 1 with the fluorescent lamps 29 and 30 is guided to an optical data conversion unit 37 through the reflecting mirror 31 and the mirrors 33 and 33'.

During optical scan of the color document, in order to prevent optical emphasis or attenuation of specific color information, the fluorescent lamps 29 and 30 comprise commercially available warm white fluorescent lamps. The fluorescent lamps 29 and 30 are turned on and driven by an RF power source of about 40 kHz in order to preventing flickering. The fluorescent lamps 29 and 30 are kept warm by a thermistor built-in heater so as to accelerate warming-up.

A standard white board 38 is mounted on the lower surface of the left portion of platen glass or the document table 28. The standard white board 38 is optically scanned to normalize an image signal as a white signal.

The optical data conversion unit 37 comprises a lens 39, a prism 40, the two dichroic mirror 2 and 3, the CCD 4 for imaging the red color-separated image, the CCD 5 for imaging the green color-separated image, and the CCD 6 for imaging the blue color-separated image.

An optical signal obtained by the optical system is converged by the lens 39 and is separated into blue color optical data and yellow optical data by the dichroic mirror 2 arranged in the prism 40. In addition, the yellow optical data is separated into red and green color optical data by the dichroic mirror 3. In this manner, the color optical image is separated into red (R), green (G), and blue (B) optical data.

These color-separated images are focused on light-receiving surfaces of the corresponding CCDs, thereby obtaining electrical image signals. These image signals are processed by a signal processing system, and each color signal is output to a write unit B.

The signal processing system includes signal processing circuits such as color separating means and the four-value converting means in addition to the A/D converters.

The write unit B includes a deflector 41. The deflector 41 comprises, e.g., a Galvano mirror, a rotary polygonal mirror, or a deflector using an optical deflector using quartz. A laser beam modulated by the color signal is deflected and scanned by the deflector 41.

When deflection and scan are started, a beam is detected by a laser beam index sensor (not shown), so that beam modulation is started by a first color signal (e.g., a yellow signal). The modulated beam is scanned on an image forming body (photosensitive drum) 42 to which a uniform charge is applied by a charger 140.

A latent image corresponding to the first color signal is formed on the image forming body 42 by main scan upon radiation of the laser beam and subscan upon rotation of the image forming body 42.

This latent image is developed by a developing unit 43 which stores a yellow toner. A predetermined developing bias voltage from a high-voltage source is applied to the developing unit. A yellow toner image is formed by this development.

Toner replenishment of the developing unit is performed by controlling a toner replenishing means (not shown) on the basis of a command signal from a system control CPU (not shown), and therefore, a toner can be replenished as needed. The yellow toner image is rotated while a cleaning blade 47a is kept separated from the drum. By using a developing unit 44 which stores a magenta toner, a latent image formed on the basis of a second color signal (e.g., a magenta signal) is developed in the same manner as in the first color signal, thereby forming a magenta toner image.

A predetermined developing bias voltage is of course, applied from the high-voltage source to the developing unit 44.

Similarly, a latent image is formed on the basis of a third color signal (black signal), and a black toner image is formed by a developing unit 45 which stores a black toner. A latent image is then formed on the basis of a fourth color signal (cyan signal) and developed by a developing unit 46 which stores a cyan toner in the same manner as described above.

A multicolor toner image is thus formed on the image forming body 42.

In the above description, a four-color toner image is formed. However, similarly, two-color or single-color toner image can be formed.

The developing process is exemplified by so-called two-component non-contact jumping development in which toner particles fly toward the image forming body 42 while an AC or DC bias voltage from the high-voltage source is applied to the image forming body.

The developing units 43, 44, 45, and 46 are replenished with predetermined amounts of toners in accordance with command signals from the CPU in the same manner as described above.

A recording sheet P fed through sheet pickup rollers 49 and timing rollers 50 is conveyed onto the surface of the image forming body 42 while sheet feeding is synchronized with rotation of the image forming body 42. The multicolor toner image is transferred to the recording sheet P by a transfer electrode 51 applied with a high voltage from the high-voltage source. The sheet P is then separated by a separation electrode 52.

The separated recording sheet P is conveyed in a fixing unit 53, and fixing is performed to obtain a color image.

After image transfer is completed, the image forming body 42 is cleaned by the cleaning unit 47 to prepare for the next image forming cycle.

In the cleaning unit 47, a predetermined DC voltage is applied to a metal roller 47b to easily recover the toner cleaned by the cleaning blade 47a. The metal roller 47b is kept separated from the image forming body 42.

After cleaning is completed, the cleaning blade 47a is separated from the image forming body. In order to remove unnecessary toner particles left on the image forming body, an auxiliary roller 47c is arranged. The auxiliary roller 47c is rotated in contact with the image forming body 42 in a direction opposite to the rotational direction of the image forming body 42, thereby sufficiently removing the residual toner particles from the image forming body 42 and perfectly cleaning it.

A sensor 48a is arranged in a sheet feed unit 48, and a detection output from the sensor 48a is fetched to the CPU.

Figure 3:
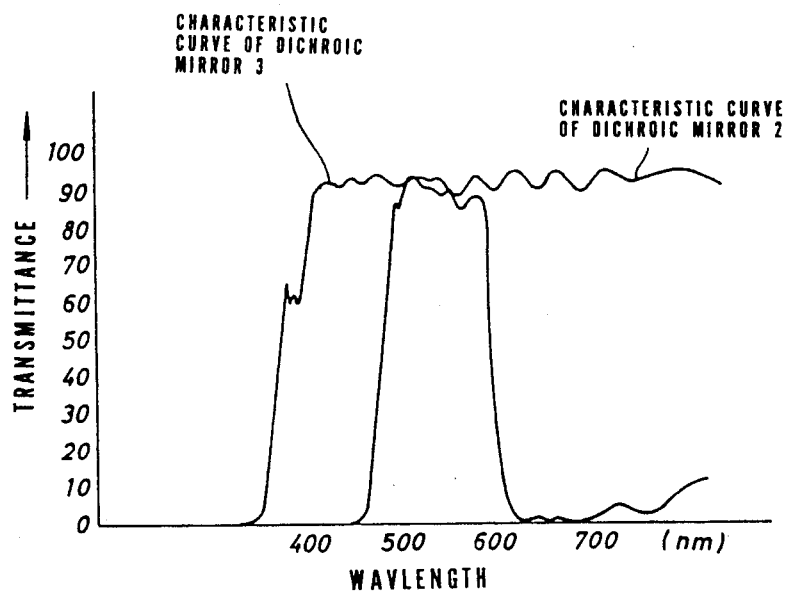
FIG. 3 is a graph showing transmittances of dichroic mirrors.
Figure 4:
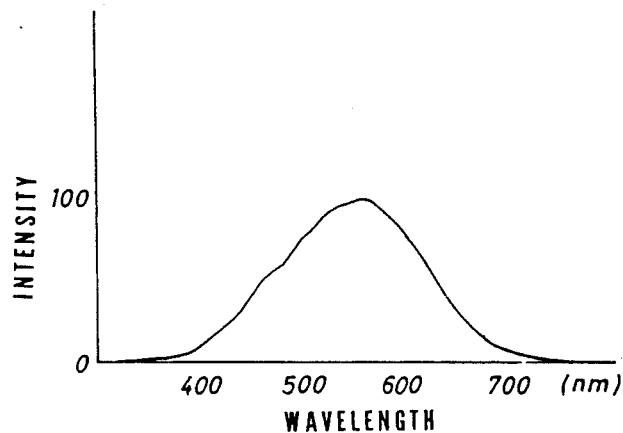
FIG. 4 is a relative spectrum chart of a light source.
Figure 5:
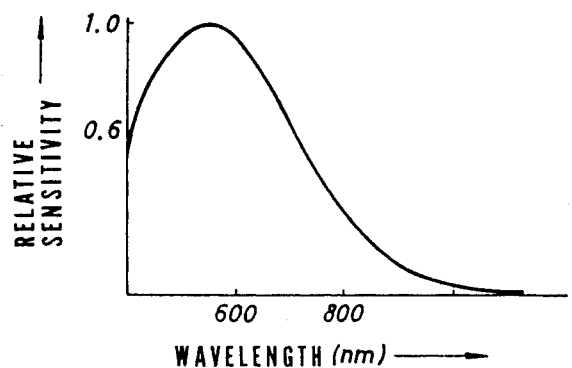
FIG. 5 is a graph showing an emission spectrum of a CCD.

The transmittance characteristic curves of the two dichroic mirrors are shown in FIG. 3, and their emission spectrum is shown in FIG. 4 when a halogen lamp is used as a light source. The spectral sensitivity characteristic curve of the CCD is shown in FIG. 5.

A light source comprises a daylight color (D) or warm white fluorescent lamp or a halogen lamp. When the halogen lamp is used, an appropriate infrared cut filter is used to provide an emission spectrum in a visible light range (as shown in FIG. 3).

Shading correction operations for red, blue, and green channels are independent of each other due to the following reason. For example, when a green-side signal is to be corrected by using a red-side white signal, variations in green-side white signal output after correction are increased since the PRNU of the red CCD is greatly different from that of the green CCD.

The shading-corrected red, green, and blue read signals are subjected to density conversion in order to reduce the volume of data for color correction in consideration of a human visual sense. An operation for converting an 8-bit red read signal into 6-bit density data (data compression) will be exemplified. The levels represented by 8 bits of the read signal are 256 levels obtained by dividing a white reference signal from the perfect black level in accordance with the A/D converter characteristics used in shading correction. Level 0 represents 0 to 1/256, and level 1 represents 1/256 to 2/256. Six bits of the density signal rarely represent information having a reflecting density of 1.5 or more and therefore represent 64 levels obtained by equally dividing an interval from density 0 to density 1.5. Therefore, level 0 represents density 0 to density 1.5/64, and level 1 represents density 1.5/64 to 2.5/64. The read signal has a reflecting intensity I, while the density signal has a reflecting intensity D, so that the following relation is established:

$$D = -\log_{10}(I/I_0)$$

where $I_0$ is a reflecting intensity of a reference white signal. A relationship between this conversion relation and a quantization level of the above signal is taken into consideration with reference to a ROM table, thereby converting a read signal into a density signal.

Density conversion of an 8-bit red read signal into a 6-bit density signal is performed. Similarly, density conversion of an 8bit green read signal into a 6-bit density signal is performed. However, since the number of levels of the blue component can be smaller than those of red and green components, density conversion of an 8-bit blue read signal into a 5-bit density signal is performed.

Color correction processing for accurately reproducing colors will be described below. When color recording is performed without color correction processing, the saturation levels of the colors are lowered, and hue components are undesirably changed.

The above drawbacks are caused by the following reasons.

(1) A total spectral sensitivity of the read unit is different from a human visual sense; and (2) Colors of toners during recording are far from ideal colors, and their saturation levels have been lowered.

A conventional linear masking method is used as this color correction processing. That is, color density signals Dr, Dg, and Db from the reading unit are converted with recording toner levels Y, M, and C according to a linear matrix.

The method using the linear matrix, however, is approximate conversion of (Dr,Dg,Db) to (Y,M,C) using polynomials, and errors inevitably occur. In order to solve this problem, a method is proposed wherein an optimal combination of (Dr,Dg,Db) and (Y,M,C) is found from all combinations by using determination values such as color difference values. This method is an optimal method for color correction. An optimal combination of (Dr,Dg,Db)→(Y,M,C) is stored in a read-only memory (ROM) as a corresponding table (look-up table). The (Dr,Dg,Db) data is referred to as an address signal to obtain (Y,M,C).

In the above case, three-color recording of (Y,M,C) is exemplified. However, according to the present invention, four-color recording by (Y,M,C,K) is actually performed. For this purpose, the (Y,M,C) is converted into (Y,M,C,K) by undercolor removal. Therefore, according to the present invention, a table for simultaneously performing color correction and undercolor removal is generated to convert (Dr,Dg,Db) into (Y,M,C,K).

Figure 7:
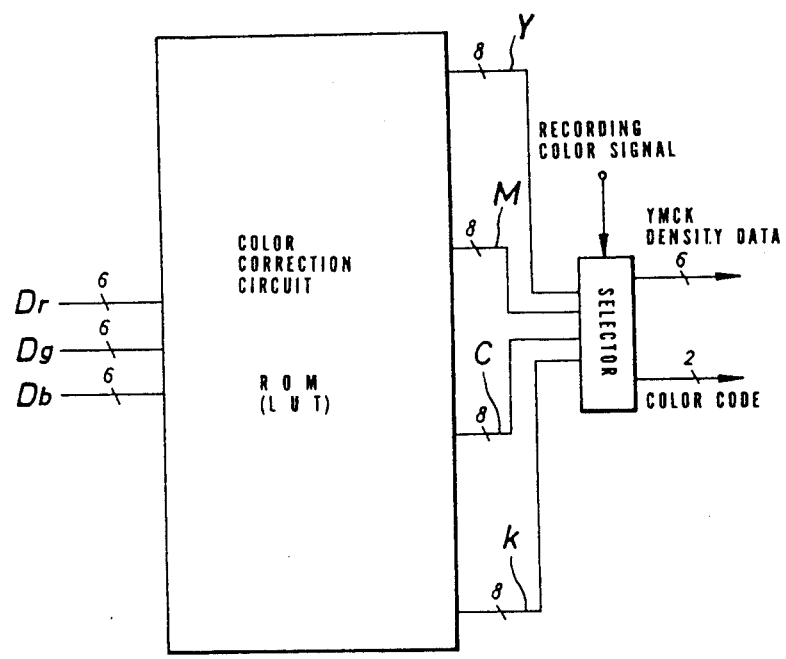
FIG. 7 is a block diagram showing the color correction circuit.

FIG. 7 is a block diagram of the color correction circuit. In this arrangement, 6-bit signals Dr, Dg, and a 5-bit signal Db are supplied as the R, G, and B signals to an LUT constituted by a color correction ROM. The LUT outputs data consisting of 6-bit Y, M, C, and K density data and 2-bit color codes. These density data of four colors are input to a selector, and the selector selects one of the density data which coincides with a color designation signal (recording color signal). The selected density data is then output. The recording color signal is a signal representing a color recorded in an image recording unit. Therefore, when yellow, magenta, cyan, and black components are sequentially recorded to form a multicolor image, read scan operations are continuously performed four times. The recording color signals are input in an order of Y, M, C, and K in the scan operations.

Figure 6:
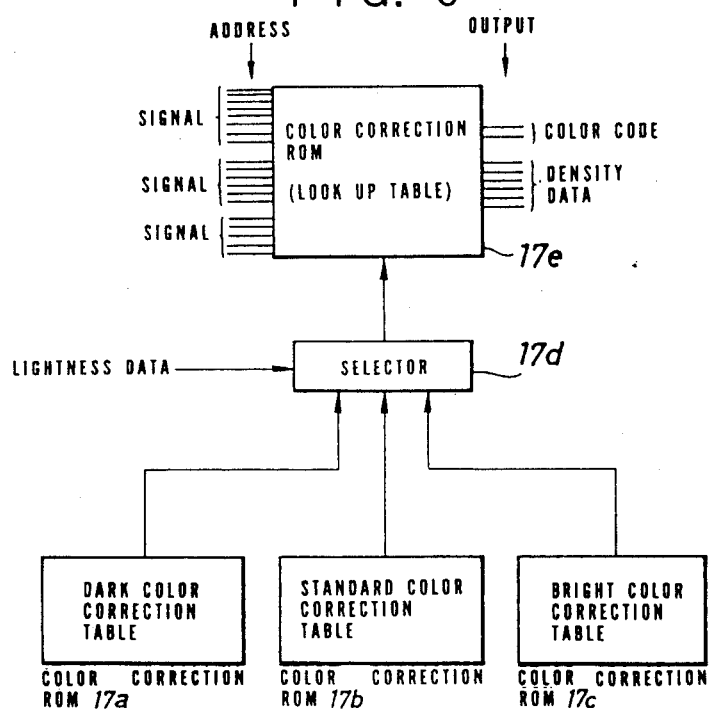
FIG. 6 is a block diagram showing a basic arrangement of a color correction circuit.

An arrangement shown in FIG. 6 can be used as a color correction circuit. Referring to FIG. 6, reference numerals 17a, 17b, and 17c denote color correction tables comprising ROMs for storing LUTs for performing color correction in accordance with lightness values of images. The color correction table 17a is used for a dark image, the color correction table 17b is used for a standard image, and the color correction table 17c is used for a bright image. Reference numeral 17d denotes a selector for selecting one of the color correction tables 17a, 17b, and 17c in accordance with a lightness detection signal of a document. Reference numeral 17e denotes a color correction RAM for storing a color correction LUT selected by the selector 17d to convert the R, G, and B signals into the Y, M, C, and K signals. According to this circuit, since an optimal LUT can be selected from a plurality of LUTs having different characteristics, quality of the recorded image can be improved. Arbitrary selection of an LUT from a plurality of LUTs is applied to allow a user to select desired color recording characteristics.

Each pixel is represented by the 2-bit color code and the 6-bit density data.

For example, a pixel having a yellow (Y) density value is level 30 in decimal notation (011110 in binary notation) is represented by a chromatic color (code 01), so that $$(\text{One-pixel data}) = \underline{01}\underline{011110}_B = 5E_{16}$$

chromatic color    density value:level 30 where B represents binary notation and 16 represents hexadecimal notation.

In this case, the codes are defined as follows:
00 . . . white
01 . . . chromatic color
10 . . . blank
11 . . . achromatic color (gray or black)

The relationship between the color codes and the density levels is given as follows:
Color Code: Density Level
00: Y=M=C=K=0
01: One of Y, M, and C is not zero.
11: Y=M=C=0 and K≠0

Conversion into recording colors M, C, and K can also be realized by the same circuit as in conversion into Y. The same contents as in Y are given to those of the color codes M, C, and K.

Color ghost correction will be described below. A color error called a color ghost occurs at an edge of a black character or the like in the read image. A color ghost has a variety of causes, and main causes associated with image reading are as follows:

(a) Positional errors (mounting precision and deterioration over time) of pixels of the three CCDs;

(b) Nonmatching of magnifications of red, green, and blue images;

(c) Differences in levels of red, green, and blue outputs which are caused by lens chromatic aberration; and (d) Noise of CCD sensors and a driver.

Causes resulting from color correction and undercolor removal are given as follows:

(e) Incomplete undercolor removal to cause a residual chromatic color component;

(f) Mismatching between color correction processing and an image reading unit; and (g) Mismatching between color correction processing and an image output unit.

Causes resulting from the image output unit are as follows:

(h) Recorded image misregistration of the Y, M, C, and K components; and (i) A nonuniform density distribution of the recorded image.

Figure 8:
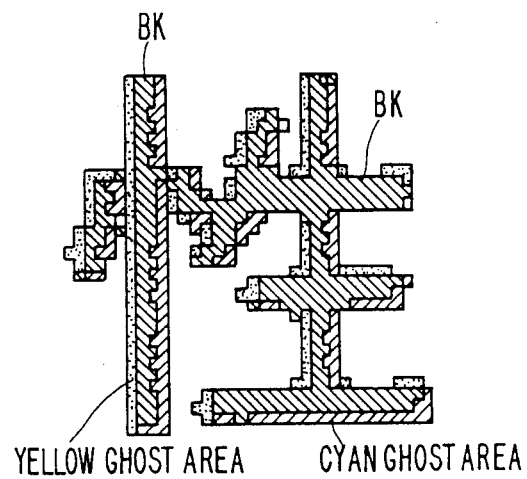
FIGS. 8 and 9 are views for explaining a color ghost phenomenon.
Figure 9:
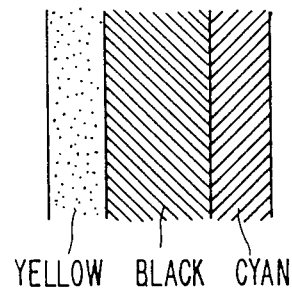

An actual color ghost is shown in FIG. 8. FIG. 8 shows the color ghost appearing after a black Chinese character "把" is imaged and the resultant information is color-separated. FIG. 9 is an enlarged view showing part of the character in FIG. 8. As is apparent from FIG. 9, yellow and cyan ghost areas appear at edges of a black line.

It is apparent that ways of generating color ghosts in other color combinations are different from that shown in FIGS. 8 and 9.

Causes of the color ghost phenomenon will be described in detail in cases (a) to (c) below.

(a) Positional Errors of Three CCDs

When positional alignment of the three CCDs is not strictly performed, yellow and cyan color ghost areas appear at black edges during color separation.

In order to avoid the color ghost phenomenon, the three CCDs must be accurately aligned with each other. They must be generally aligned with an allowance of 1 or less pixel and preferably an allowance of ¼ or less pixel. In this embodiment, in order to realize this, the three CCDs are aligned on a jig and are fixed by an adhesive.

(b) Mismatching of Magnifications of Red, Green, and Blue Images.

Figure 10:
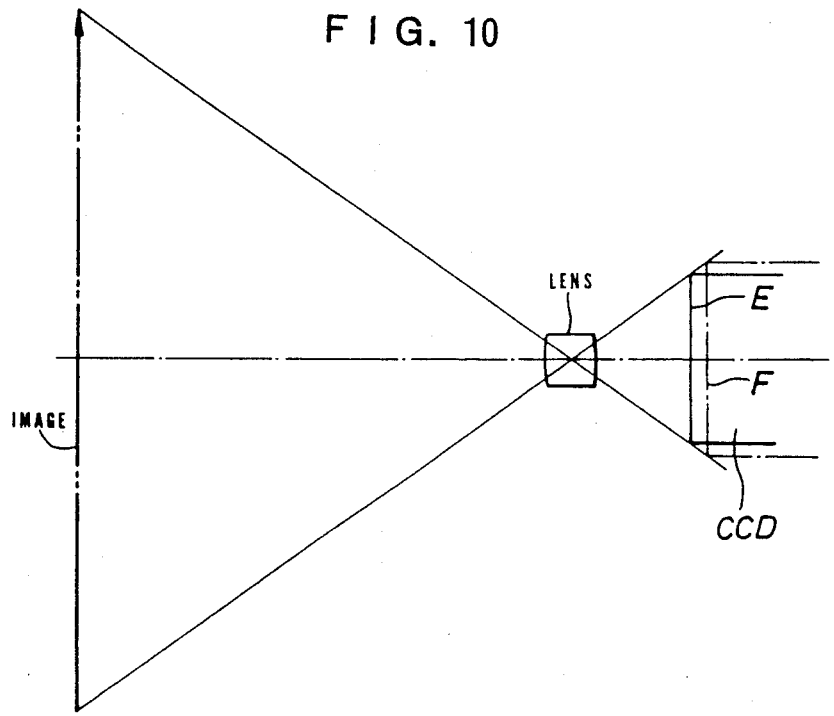
FIG. 10 is a view for explaining generation of a color ghost.

When a color document is processed, it is adversely affected by lens chromatic aberration. When a wavelength range is divided into green and blue wavelength ranges, a focusing position F of the green side is different from a focusing position E of the red side, as shown in FIG. 10. Mismatching of magnifications particularly appears at a higher image portion. Some lenses may cause an error of about one pixel.

(c) Differences in Levels of Red, Green, and Blue Outputs

When an improvement of lens chromatic aberration is not taken into consideration during lens design, MTF values for lens chromatic aberration are greatly different in red, green, and blue outputs. These differences appear as level differences as outputs from the CCDs.

The level difference must be taken into consideration at the time of CCD mounting. When a black line is imaged, and red, green, and blue output signals are quantized by 8-bit A/D converters, level differences between the red, green, and blue output signals preferably fall within the range of 4 or less.

By the above implementations, the color ghost can be reduced to some extent. However, it is difficult to perfectly eliminate the color ghosts because of variations in performance of mass-produced lenses, variations in CCD mounting, and the like.

Color ghost correction is therefore electrically performed by using color codes after color separation.

The color ghost can be eliminated by a color pattern method because a ghost color with respect to an original color, i.e., original black→chromatic color ghost, is predetermined. According to the color pattern method, in order to determine a color of a pixel of interest, a document image color can be identified by detecting the pixel of interest and a way (pattern) of generating colors of peripheral pixels.

For example, a color pattern around the pixel of interest and a way of determining a color of the pixel of interest are shown in FIG. 11.

In the first case, white and black pixels are located at both sides of the pixel of interest. A chromatic color of the pixel of interest is determined as a color ghost appearing at a black edge. Therefore, in the first case, the pixel of interest is changed to black.

In the second case, a color ghost is not determined, and a color of pixel of interest is output without any change.

It is difficult to realize the above operations by an arithmetic circuit. In this embodiment, an LUT (lookup table) constituted by a ROM is used. In this case, there may be one- and two-dimensional color patterns. The number of color patterns is given as:

$$N^M$$

where N is the number of colors and M is peripheral pixels including the pixel of interest. Therefore, it is possible to use a two-dimensional pattern. In this case, the number of M is abruptly increased. That is, the number of peripheral pixels in each direction (i.e., the main scan/subscan direction) of the two-dimensional pattern cannot be sufficiently increased, but the number of patterns is large.

FIG. 12 shows a relationship between pattern sizes and the number of color patterns.

In this embodiment, a color pattern having a one-dimensional size of $1 \times 7$ (i.e., N=4 and M=7) is used. Color ghost elimination in the main scan direction is independently performed of that in the subscan direction. In this case, the way of generating a color ghost in a image in the main scan direction is the same as that in the subscan direction. Therefore, in this embodiment, identical patterns are used in the main scan and subscan directions.

Although the one-dimensional size of $1 \times 7$ is selected as a color pattern size, a smaller size of, e.g., $1 \times 5$ may be used if the frequency of appearance of the color ghost is low. A color ghost of one pixel can be eliminated by the size of $1 \times 5$, and that of a maximum of two pixels can be eliminated by the size of $1 \times 7$.

When the color pattern having a size of $1 \times 7$ is used, the number of color patterns is $4^7 = 16,384$. In the present invention, a color code is input as an address signal to the ROM.

FIG. 11 shows color patterns. In the first case,

| white white white (peripheral pixel color) | chromatic (color of pixel of interest) | black black black (peripheral pixel color) |
| --- | --- | --- |

The corresponding color code pattern is given as follows:

| white | white | white | chromatic | black | black | black |
| --- | --- | --- | --- | --- | --- | --- |
| 00 | 00 | 00 | 01 | 11 | 11 | 11 | therefore, the address is given as $007F_{16}$ by using the above pattern without any change.

Data for converting the color of the pixel of interest from a chromatic color to an achromatic color is stored at this address, as shown in FIG. 11. When data are stored to designate conversion/nonconversion by using all patterns of $1 \times 7$ as address signals, a color ghost correction LUT can be formatted.

In practice, a 14-bit address bus is required for the pattern of $1 \times 7$ A bipolar ROM must have 14 address bit input pins and two color code output pins. However, such a large-capacity, high-speed ROM is not commercially available and expensive.

In this embodiment, the ROM is selected by the first pixel, and a code of the remaining six pixels is used to access the LUT. As a result of color ghost detection, when a pixel color must be converted into an achromatic color, its color code is converted into conversion color "10".

Color ghost correction is performed first in the main scan direction of the image and then in the subscan direction. When an end output code of the pixel of interest is conversion color code "10" (i.e., when a color ghost is detected), the following density level conversion is performed.

More specifically, when the recording color is Y, M, or C, the density level is set to be "0" (elimination of chromatic color ghost).

When the recording color is K, a density level is added (e.g., +16). This addition is performed to prevent thinning of the black line which is caused by chromatic color ghost elimination.

If a high-speed ROM (large capacity) is available, color patterns can be stored, in a single ROM. However, four ROMs may be switched to access the LUTs in accordance with an order of the colors of pixels.

A ROM MB7143/7144 or the like from FUJITSU, LTD., is commercially available as a high-capacity, high-speed bipolar ROM.

When a low-speed, large-capacity EPROM is used, a data is transferred to a plurality of SRAMs or the like, and color ghost correction is performed by using these SRAMs.

Figure 13:
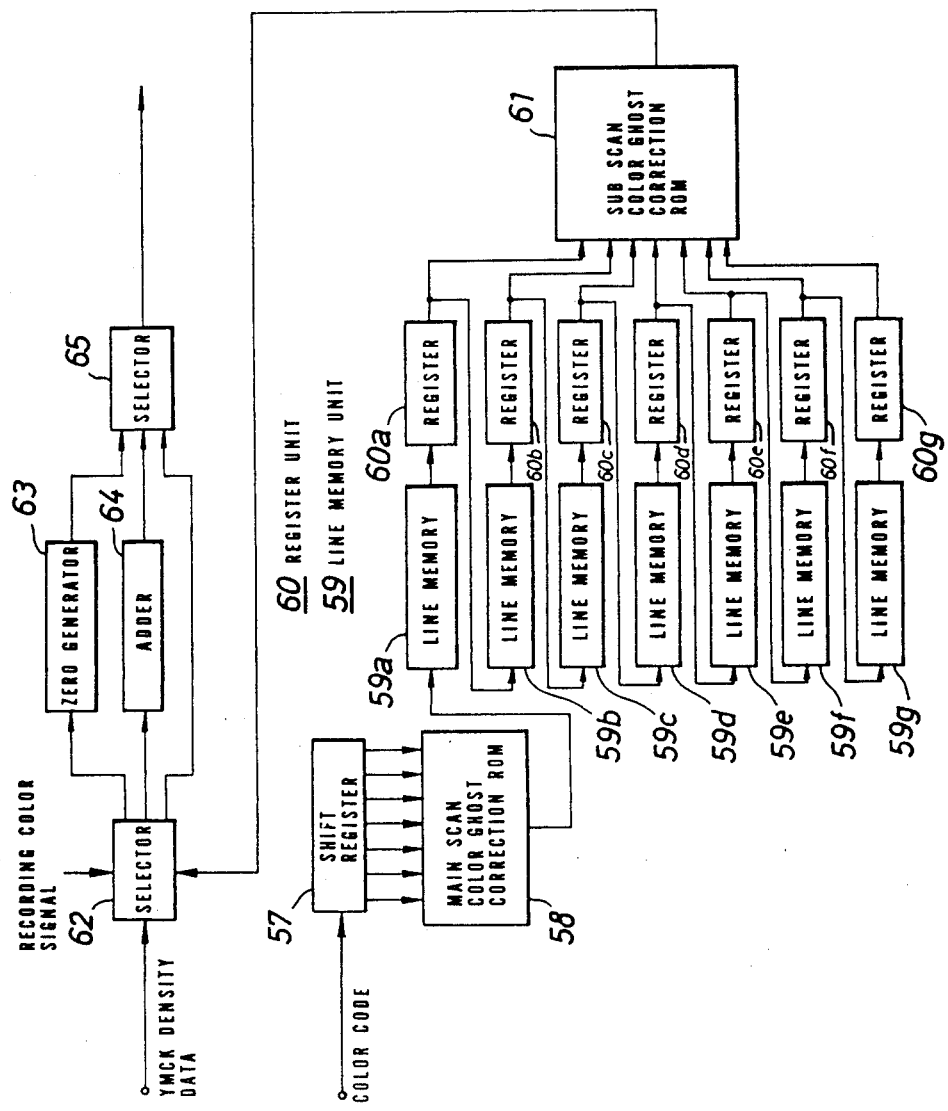
FIG. 13. is a block diagram of a color ghost correction circuit.

FIG. 13 is a block diagram showing an arrangement of the color ghost correction circuit 18. Color ghost processing is performed in both the main scan direction (horizontal scan direction) and the subscan direction (vertical scan direction).

In this embodiment, color ghosts are eliminated in the horizontal and vertical directions by utilizing image data having seven pixels in the horizontal direction and seven lines in the vertical direction.

Only color codes of the image data are subjected to color ghost processing.

For this reason, a color code read out from the color correction ROM is supplied to a 1-bit shift register 57 in order to perform parallel color ghost correction in the main scan direction. 1-pixel parallel color code data from the shift register 57 is supplied to a horizontal ghost detection ROM 58, and ghost detection in units of pixels is performed. An operation of the ROM 58 is the same as described above.

The serial color code data is supplied to a line memory unit 59.

The line memory unit 59 is arranged to eliminate the vertical color ghost by using 1-line image data. A register unit 60 includes registers 60a to 60g respectively corresponding to the line memories 59a to 59g.

The 1-line color code data from the line memory unit 59 is supplied to a subscan color ghost correction ROM 61. The vertical color ghost is detected from the 1-line color code data, and the code data is supplied to a selector 62.

Referring to FIG. 13, components 62 to 65 constitute a color ghost elimination circuit 18a. Reference numeral 62 denotes the selector for sorting the density data on the basis of the Y, M, C, an K recording color signals and the color code; 63, a zero generator for outputting a zero signal; 64, an adder for performing an addition (e.g., +16); and 65, a selector switched in synchronism with the selector 62. When color codes supplied from the ROM 61 to the selector 62 are "00", "01", and "11", the selectors 62 and 65 output the color codes without any changes. However, the color code is "10" (conversion color), a color ghost is detected. The Y, M, and C density data are set to be zero by the zero generator 63. The K density data is added by the adder 64, and a sum is output therefrom. By these operations, the density data free from the color ghost components are output.

Figure 14:
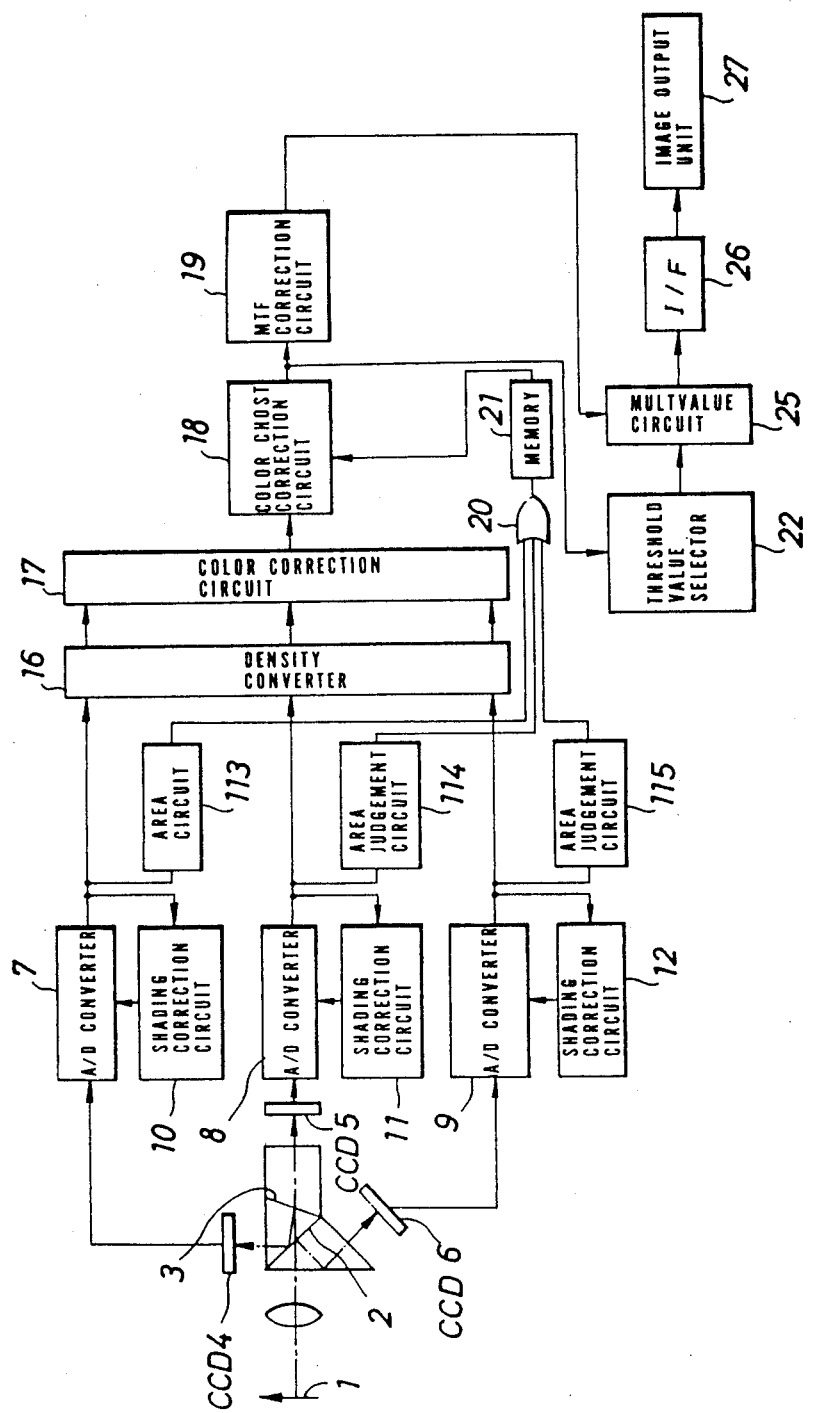
FIG. 14 is a block diagram of a color image processing apparatus including another color ghost correction circuit according to another embodiment of the present invention.

In an embodiment shown in FIG. 14, a function for judging an image as a line or halftone image and switching a color ghost correction method in accordance with the judgement result is added to the arrangement of FIG. 1. The same reference numerals as in FIG. 1 denote the same parts in FIG. 14.

Various methods have been proposed as methods of edging images. Color judgement is performed by area judgement circuits 113, 114, and 115 in units of colors by using one of the conventional image judgement methods, thereby judging the input image as a line or halftone image. Color ghost correction is performed for only an area which is judged to be a line image. With this operation, color ghost correction indispensable to the line-image area can be performed therein without unstable color reproducibility of the halftone image area.

A modification of color ghost correction is shown below.

In the color correction circuit in FIG. 7, density data K represents a density of a single color independently of the density data Y, M, and C. When a color code represents a chromatic color, the density data K is not output. When the color code represents an achromatic color or a single-color image is to be formed, the density data K is output.

Figure 15:
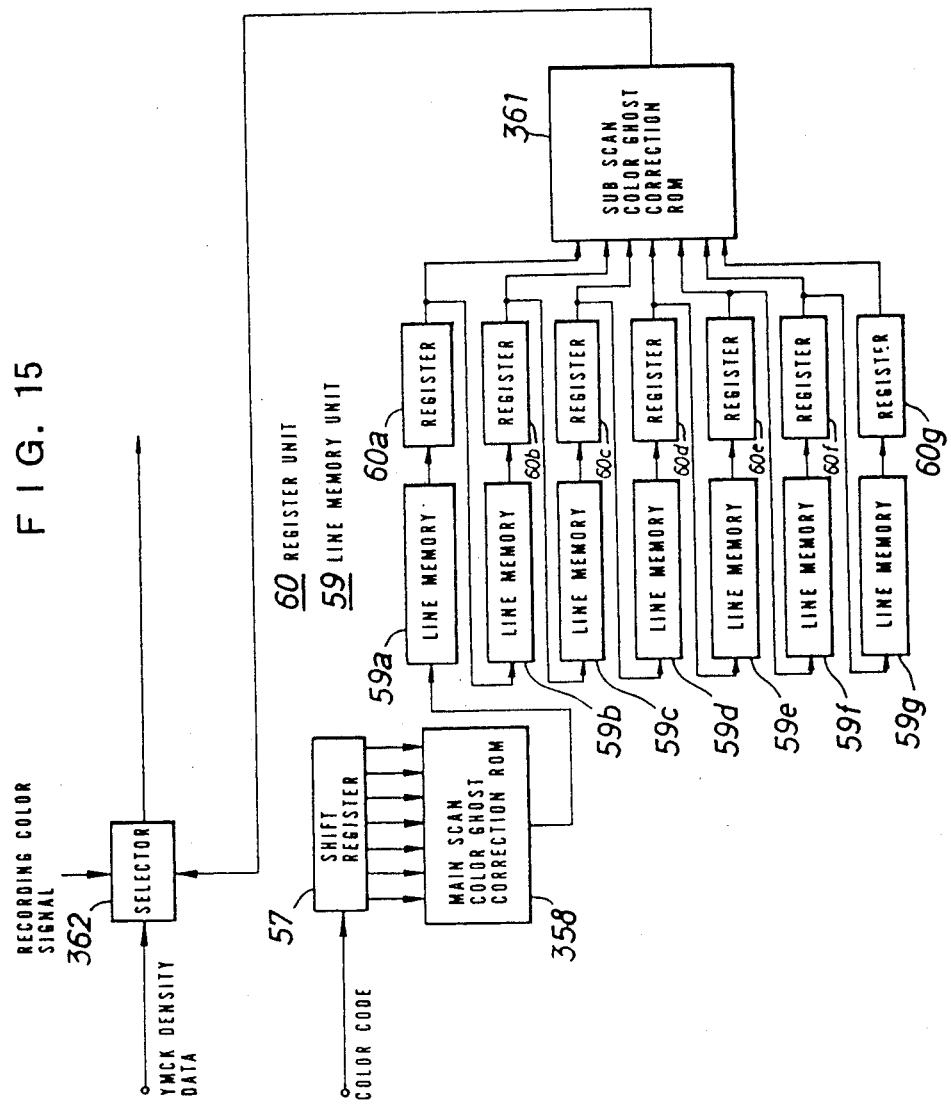
FIG. 15 is a block diagram of a color ghost correction circuit according to still another embodiment of the present invention.

In this case, the color ghost correction circuit 18 is arranged as shown in FIG. 15 (the same reference numerals as in FIG. 13 denote the parts having the same functions in FIG. 15). In the same manner as in FIG. 13, color ghost correction of color codes is performed in both the main scan direction and the subscan direction. In the circuit shown in FIG. 13, when a color ghost is detected, the color code is converted into a conversion color code by the ROMs 58 and 61. However, in the arrangement of FIG. 15, a color code is converted into black in ROMs 358 and 361. The corrected color code drives a selector 362. The density data input to the selector 362 is one of the density data Y, M, C, and K in correspondence with the recording color signal. If the density data is Y, M, or C, and only if the color code output from the ROM 361 represents a chromatic color, the density data is output from the selector 362. However, if the recording color signal is K and only if the color code represents an achromatic color, the density data is output from the selector 362.

Causes of MTF degradation until recording and reproduction of an image are generally classified as follows:

(1) Problems in an optical system
(2) Problems in an optical drive system
(3) Problems in a processing circuit
(4) Problems in a recording system Problems (1) in the optical system are variations in performance of the optical system which are caused by an lens MTF (individual wavelength ranges, changes in image height, an allowable width of a focusing position, and working precision), precision of a prism surface, mounting precision of CCDs, warp of a CCD chip, spectral variations in light source, and the like.

Problems (2) in the optical drive system are vibrations of optical mirrors and the like, and variations in moving speed.

Problems (3) in the processing circuit are caused by signal waveform distortion by an allowable component in an analog circuit, and especially, signal distortion generated via a transmission line or the like.

Problems (4) in the recording system are listed as follows:

Diameter and shape of a laser beam

Development characteristics of a toner on a photosensitive drum (e.g., a toner attraction amount, a toner density, a toner particle size, and a toner color)

Transfer characteristics (e.g., a transfer rate, and transfer characteristics of toner particles on a transfer sheet)

Fixing characteristics (e.g., a variation in toner diameter before and after toner fixing)

Of these factors, the optical system and its drive system directly affect degradation of the resolution.

Figure 16A:
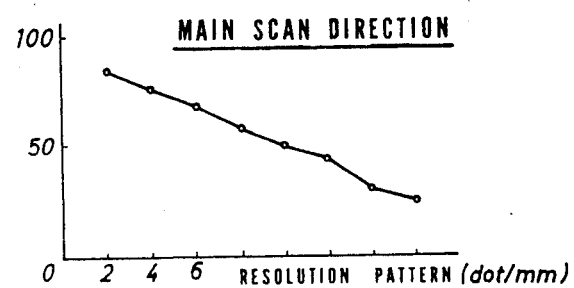
FIGS. 16A to 17B are graphs for explaining MTF correction.
Figure 16B:
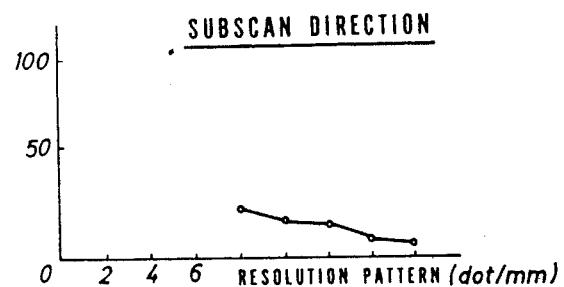

FIGS. 16A and 16B show MTF values (prior to correction) in the main scan and subscan directions when the optical system is driven. These characteristics represent measured values when a monochromatic pattern having a spatial frequency of 2 to 16 dots/mm is scanned.

In this case, an MTF value is defined as follows:

$$MTF=(W-BK)/(W+BK)\ (\%)$$

where W is a white signal and BK is a black signal.

As is apparent from FIGS. 16A and 16B, degradation of MTF characteristics along the subscan direction is worse than that along the main scan direction. In order to equally correct the MTF values in the main scan and subscan directions, a correction amount in the subscan direction is set to be two to four times that in the main scan direction.

In order to improve reproducibility of a thin line portion of an image, a MTF value must be 30% or more.

When a resolution correcting means is constituted by a pixel of interest and weighting of peripheral pixels, a convolution filter using image data of a 3×3 pixel matrix is used as a resolution correcting means in order to equally correct the MTF values in the main scan and subscan directions and prevent degradation of thin line portions.

Filter elements and corresponding pixel positions (i,j) are written in the upper and lower rows as follows:

$$\begin{pmatrix} a & b & c \\ d & e & f \\ g & h & i \end{pmatrix},$$

$$\begin{pmatrix} (i-1,j-1) & (i-1,j) & (i-1,j+1) \\ (i,j-1) & (i,j) & (i,j+1) \\ (i+1,j-1) & (i+1,j) & (i+1,j+1) \end{pmatrix}$$

Eight pixels around the pixel (i,j) of interest having a density Iij are taken into consideration. In this case, new density values Iij' for the pixels (i−1,j−1) to (i+1,j+1) are defined as follows:

$$Iij' = Iij \times Cij$$

where Cij is a filter coefficient given such that Cij=a, b, c, ..., i.

Filter coefficients for realizing the correction contents described above are exemplified as follows:

$$\frac{1}{4} \begin{pmatrix} 0 & -2 & 0 \\ -1 & 8 & -1 \\ 0 & -2 & 0 \end{pmatrix} \rightarrow \begin{pmatrix} 0 & -1 & 0 \\ -0.5 & 4 & -0.5 \\ 0 & -1 & 0 \end{pmatrix}$$

In order to increase a correction value, a corresponding filter coefficient can be appropriately set.

Figure 17A:
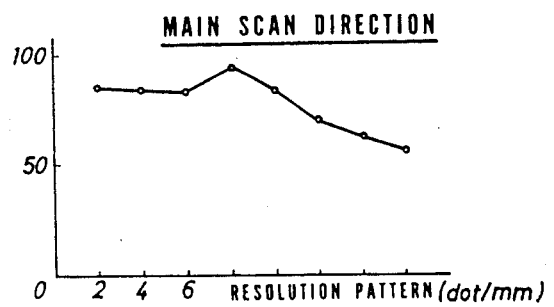
Figure 17B:
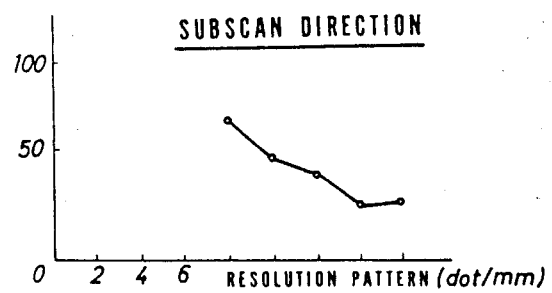

Correction results obtained by a convolution filter by using the above correction coefficients are shown in FIGS. 17A and 17B.

FIG. 18 is a block diagram showing an arrangement of the MTF correction circuit 19 using this convolution filter.

When a 3×3 matrix is used, two line memories 19a and 19b and nine latches 19c to 19k are arranged. 1 (row) ×2 (columns) and 3 (rows)×3 (columns) convolution operations are performed by a first adder 19l and a multiplier (bit shift circuit) 19m. 2 (rows)×1 (column) and 2 (rows)×2 (columns) convolution operations are performed by a second adder 19o. A 2 (rows)×2 (columns) matrix operation is performed by a multiplier 19n. These operation outputs are added by third and fourth adders 19p and 19q. A sum signal from the adder 19p is normalized by a normalization circuit 19r, thereby obtaining the new density value Iij'.

The MTF correction circuit 19 may be arranged by using a ROM and the like in place of the multiplication and addition/subtraction operations.

Resolution (MTF) correction is performed after color ghost processing. However, resolution correction may be performed any time after color correction processing and before multi-value conversion processing.

The line memories 19a and 19b may be substituted by the line memories used for color ghost correction.

When a character image is converted into multi-value data, the threshold value ROM constituting the automatic threshold value setting means 24 is addressed by the Y, M, C, and K signals and the level designation signal designated at the operation/display unit, thereby outputting predetermined multi-value threshold values.

When a photographic image is converted into multi-value data, e.g., a 4×4 dither matrix is prepared as a threshold value ROM. Counter outputs for designating rows and columns are used to control addressing of the threshold value ROM. This matrix is shown in FIG. 19.

A 4-value image signal is supplied to the output unit through the interface circuit 26.

Figure 20:
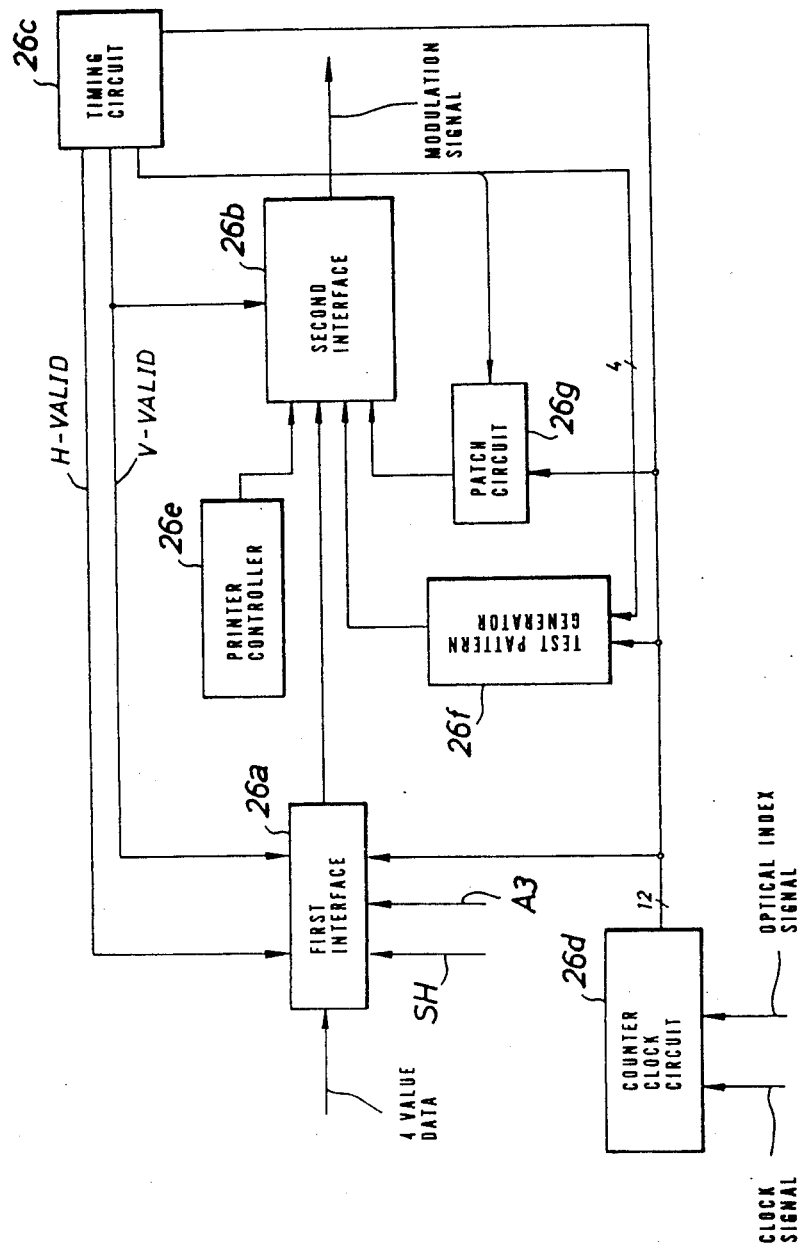
FIG. 20 is a block diagram of an interface circuit.

The arrangement and operation of the interface circuit 26 will be described with reference to FIG. 20. The interface circuit 26 comprises a first interface 26a for receiving 4-value data, and a second interface 26b for receiving 4-value data output from the first interface 26a.

The first interface 26a receives horizontal and vertical valid area signals H-VALID and V-VALID from a timing circuit 26c and a clock cf a predetermined frequency (12 MHz in this embodiment) from a counter clock circuit (OSC) 26d.

The 4-value data is output from the first interface 26a to the second interface 26b in synchronism with the CCD drive clock during which the horizontal and vertical valid area signals are being generated.

The counter clock circuit 26d generates main scan timing clocks synchronized with an optical index signal.

The second interface 26b selects the 4-value data output from the first interface 26a and other image data and outputs them to the image output unit 27.

Other image data are defined as the following image data.

First data is test pattern data output from a test pattern generator 26f. Second data is patch image data output from a patch circuit 26g. Third data is control data output from a printer controller 26e.

The test pattern image data is used to inspect image processing. The patch image data for toner density detection is used during patch processing.

The test pattern generator 26f and the patch circuit 26g are driven in response to clocks from a counter clock circuit 44, and therefore, the 4-value data output from the first interface 26a is synchronized with driving of the circuits 26f and 26g.

The 4-value data output from the second interface 26b is used as a laser beam modulation signal for the image output unit 27.

Figure 21:
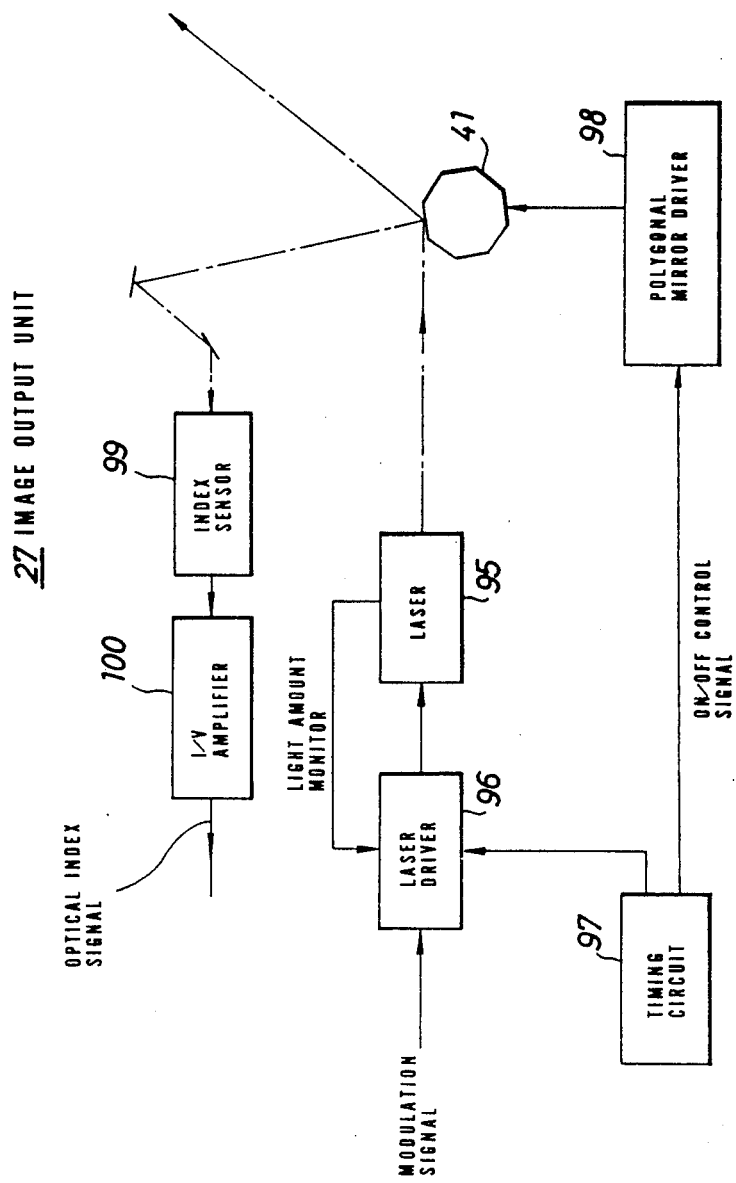
FIG. 21 is a block diagram of an image output unit.

FIG. 21 is a detailed block diagram of the image output unit 27. A laser driver 96 is connected to a semiconductor laser oscillator. The 4-value data is supplied to the laser driver 96 as a modulation signal. The laser beam is modulated by this modulation signal. The driver 96 is controlled by a control signal from a timing circuit 97 so as to be operated during only the horizontal and vertical valid periods. A signal representing an amount of laser beam is fed back to the laser driver 96 to control laser driving such that an amount of laser beam is maintained to be constant.

The scan start point of the laser beam deflected by the deflector 41 constituted by an octahedral mirror is detected by an index sensor 99. The index signal from the index sensor 99 is converted into a voltage signal by an I/V amplifier 100. The index signal is supplied to the counter clock circuit 26d and the like to form a line signal SH. At the same time, an optical main scan timing is adjusted.

Reference numeral 98 denotes a polygonal mirror driver which receives an ON/OFF signal from the timing circuit 97.

Figure 22:
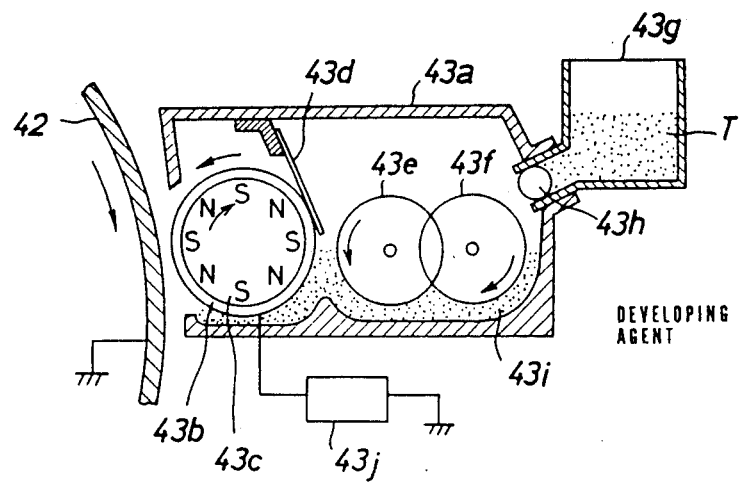
FIG. 22 is a sectional view showing a main part of a developing unit.

FIG. 22 is a view showing an arrangement of a developing unit.

Referring to FIG. 22, reference numeral 43a denotes a housing. A cylindrical sleeve 43b is rotatably mounted in the housing 43a. A magnetic roller 43c having eight N and S poles is arranged in the sleeve 43b. A layer regulating member 43d is kept in light contact with the outer developing agent layer attracted to the sleeve 43b is regulated to have a predetermined value. The predetermined value is a given value falling within the range of 10 to 500m.

First and second stirring members 43e and 43f are arranged inside the housing 43a. A developing agent stored in a developing agent reservoir 43i is sufficiently stirred and mixed by the first stirring member 43e rotated in the counterclockwise direction and the second stirring member 43f which is rotated in a direction opposite to that of the first stirring member 43e and which overlaps the first stirring member 43e. The sufficiently stirred and mixed developing agent is attracted to the surface of the sleeve 43b by a rotational/convey force of the sleeve 43b and the magnetic roller 43c which are rotated in opposite directions.

A latent image formed on the image forming body 42 is developed, in a noncontact manner, by the developing agent attracted to the image forming body 42.

During development, a developing bias signal supplied from a power source 43j is applied to the sleeve 43b. The developing bias signal is supplied from the power source 43j and consists of a DC component which is set to have a potential almost equal to that of a nonexposed portion of the image forming body 42 and an AC component superposed on the DC component.

As a result, only the toner of the developing agent on the sleeve 43b is attracted to the surface of the image forming body 42 which has a selective latent image thereon, thereby performing development.

Reference numeral 43g denotes a toner hopper; and 43h, a toner replenishing roller.

A two-component developing agent is used as a developing agent. When a developing bias is not applied and the image forming body 42 is kept separated from the developing agent, the toner flies to the latent image selectively formed on the image forming body 42 in the presence of a vibrating electric field upon application of the AC bias, thereby developing the latent image.

When a developing method in a noncontact state is used and a multicolor toner image obtained by sequentially forming yellow, cyan, magenta and black toner images on the image forming body 42 is formed, the previous toner images are not damaged by the next toner image and development of thin layers can be advantageously achieved.

Figure 23:
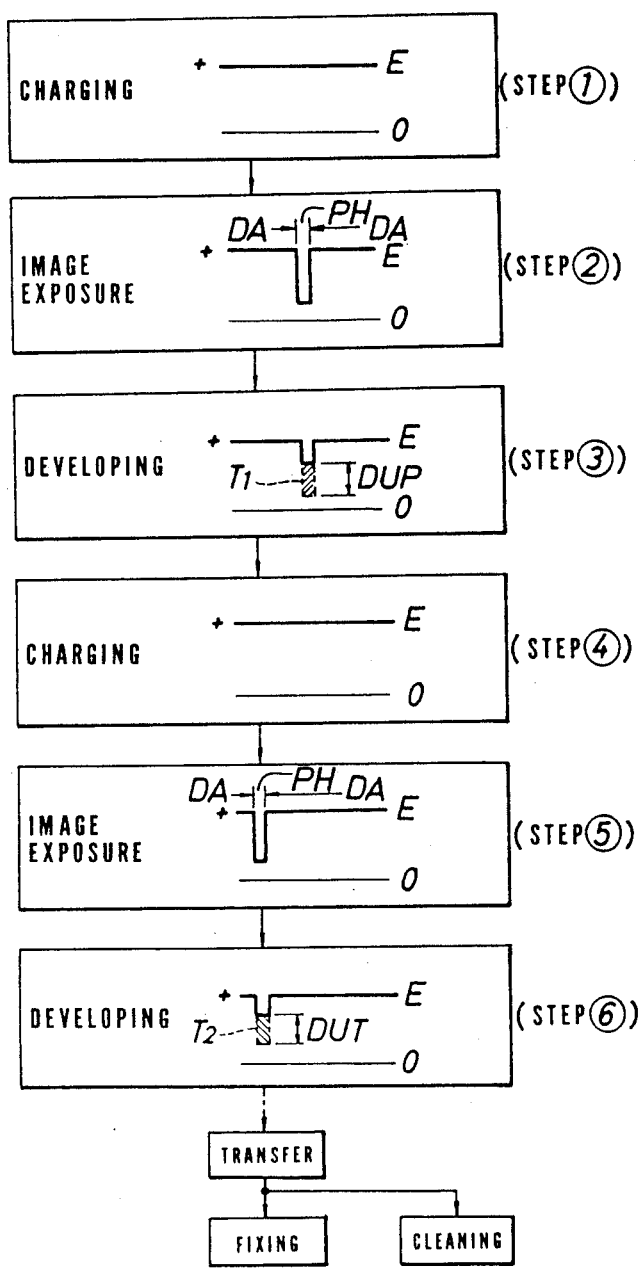
FIG. 23 is a view for explaining a developing process.

FIG. 23 shows charging, exposing, and developing steps.

FIG. 23 actually indicates changes in surface potentials of the image forming body 42. A charging polarity is exemplified as a positive polarity. Reference symbol PH denotes an exposed portion of the image forming body; DA, a nonexposed portion; and DUP, an increase in potential upon attraction of a positively charged toner $T_1$ by the first developing operation.

The image forming body 42 is charged to a uniform positive potential E by a charger (step ①).

A first image exposing beam from a laser as an exposing light source causes a decrease in potential of the exposed portion PH in accordance with a light amount (step ②).

A latent image formed as described above is developed by the developing unit applied with a positive bias almost equal to the surface potential E of the nonexposed portion (step ③). As a result, the positively charged toner $T_1$ is attracted to the exposed portion having a relatively low potential, thereby forming a first toner image. The potential of the area having this toner image is increased by DUP upon attraction of the positively charged toner $T_1$. However, this potential is not increased to the same potential as that of the nonexposed portion DA.

The second charging operation of the image forming body having the first toner image thereon is performed by the charger. As a result, the surface potential of the image forming body is set to have the uniform surface potential E regardless of the presence/absence of the toner $T_1$ (step ④).

A second image exposing beam is incident on the surface of the image forming body 42 to form a latent image (step ⑤).

A positively charged toner $T_2$ of a color different from that of the toner $T_1$ is attracted to the latent image to obtain a second toner image (step ⑥).

In the same processes as described above, a multicolor toner image is formed on the image forming body. The multicolor toner image is transferred to the transfer sheet P and is fixed by heating or compression, thereby obtaining multicolor recorded image data. In this case, a residual toner on the surface of the image forming body and residual charge thereon are cleaned and cleared to prepare for the next cycle for forming a multicolor image.

The developing process is performed such that the developing agent layer is not in contact with the surface of the image forming body.

In addition to an electrophotographic method, a method of forming latent images for a multicolor image forming body can be a method of directly injecting a charge on the image forming body by a multi-needle electrode or the like to form a latent image, or a method of forming a magnetic latent image by a magnetic head.

In the apparatus, a two-component developing agent consisting of a nonmagnetic toner and a magnetic carrier is preferably used since toner frictional charging control can be facilitated, the developing characteristics are excellent, and an arbitrary color can be assigned to the toner.

The following specific mode of the image forming body 42 can be provided.

One latent image is developed by one type of toner, and the toner is changed every developing cycle to obtain a multicolor toner image.

One latent image is successively developed by plural types of toner to develop it. As a result, a toner image having two or more colors can be obtained.

Two or more latent images are developed by the same types of toner (one type or plural types). As a result, image synthesis can be performed.

Figure 24:
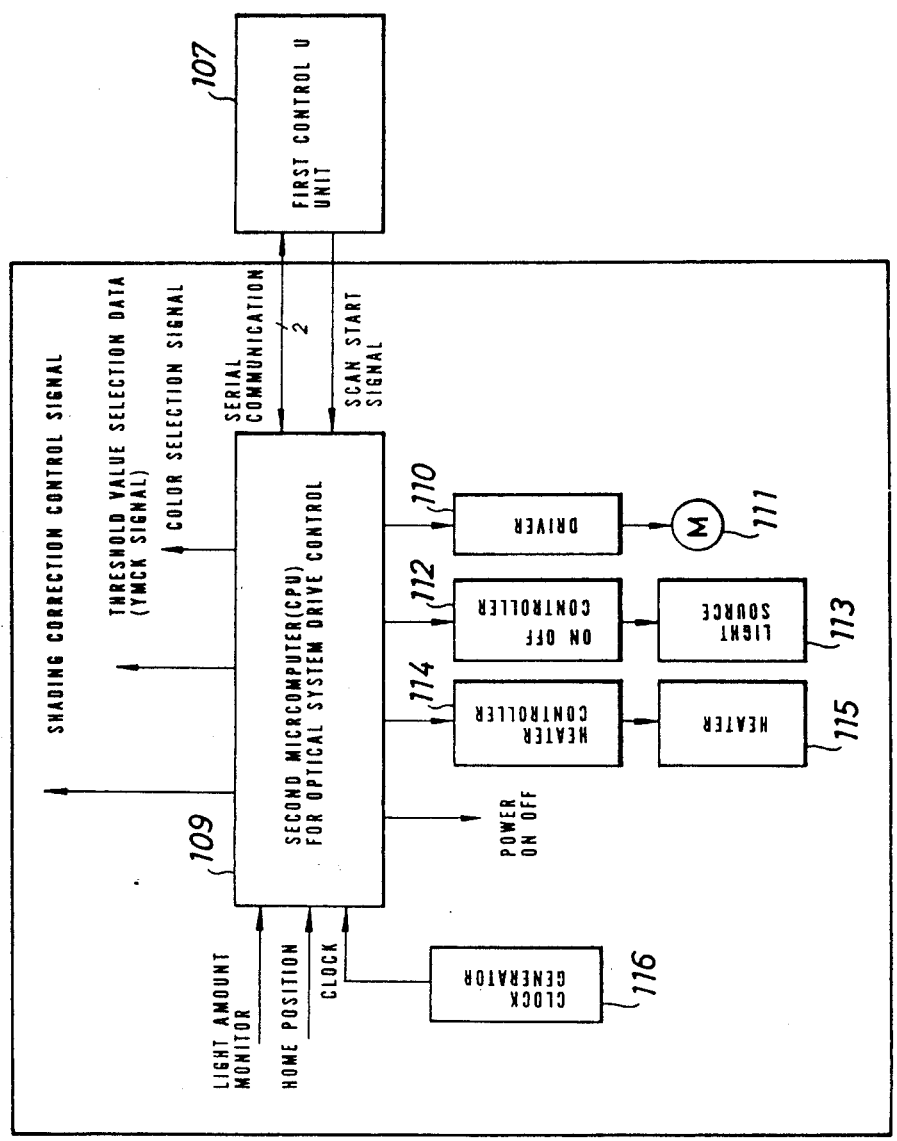
FIG. 24 is a block diagram of a second control unit.

FIG. 24 is a block diagram showing first and second control units. All the above-mentioned units and circuits are controlled by first and second control units 107 and 108. First, the second control unit 108 will be described.

The second control unit 108 mainly controls an image reading system and its peripheral devices. Reference numeral 109 denotes an optical drive control microcomputer (the second microcomputer) which serially communicates various data signals with the main body first control unit 107. An optical scan start signal sent from the first control unit 107 is directly supplied to an interrupt terminal of the second microcomputer 109.

The second microcomputer 109 generates various command signals in synchronism with clocks of a predetermined frequency (e.g., 12 MHz) from a reference clock generator 116.

The second microcomputer 109 outputs a threshold value selection signal, Y, M, C, and K signals (color selection signals), and the like.

The second microcomputer 109 further outputs the following control signals.

First, an ON/OFF control signal for controlling the drivers of the CCD sensors 4, 5, and 6 is supplied to a power controller (not shown). Second, a predetermined control signal is supplied to an ON/OFF controller 112 for turning on/off a light source 113 for emitting a beam on the document 1. Third, a control signal is supplied to a driver 110 for driving a motor 111 for moving a movable mirror unit (34, etc.) arranged in the image reading unit A. Fourth, a control signal is supplied to a heater controller 114 for the heater 115.

The second microcomputer 109 receives light amount data of the light source and home position data.

Figure 25:
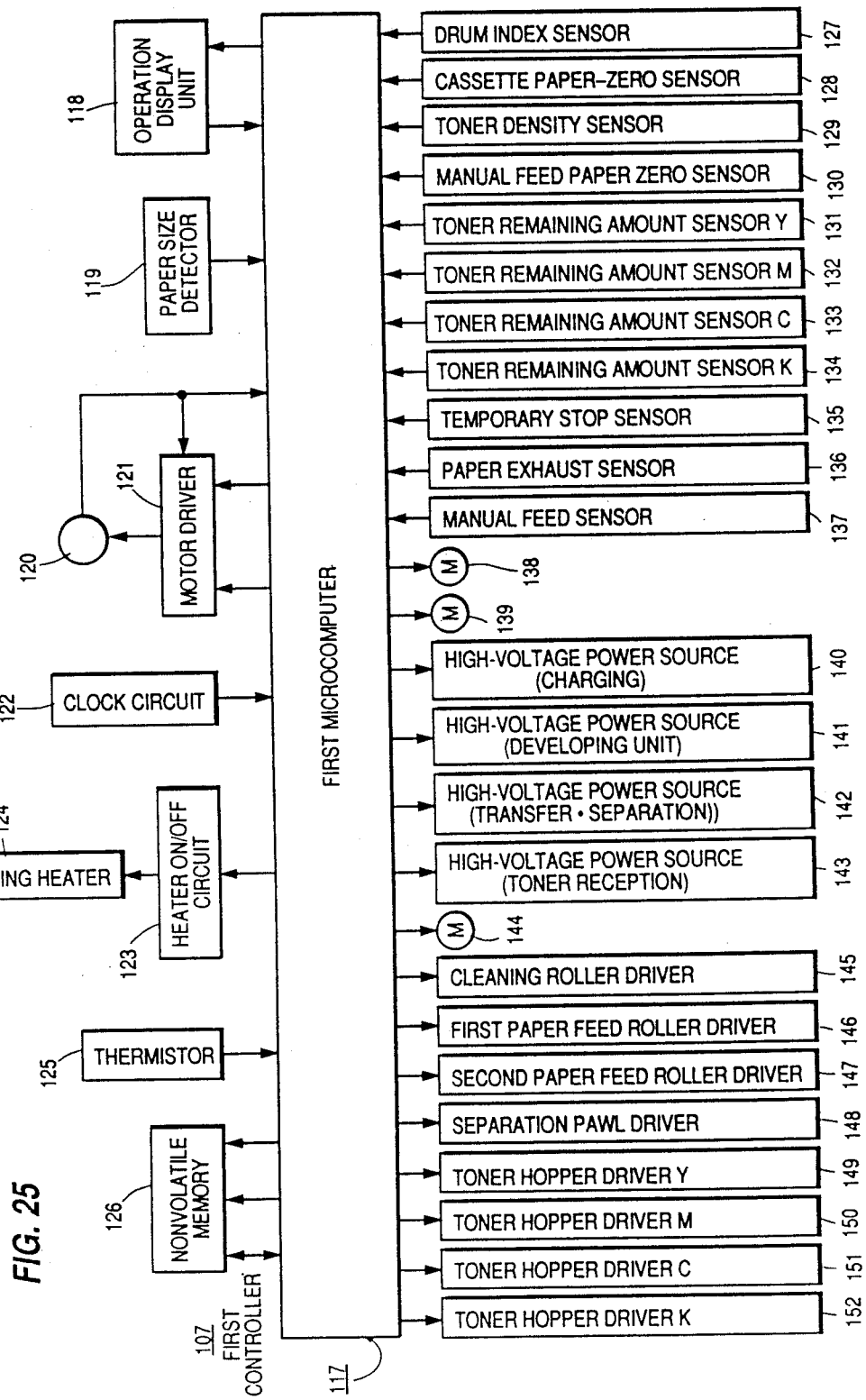
FIG. 25 is a block diagram of a first control unit.
Figure 26:
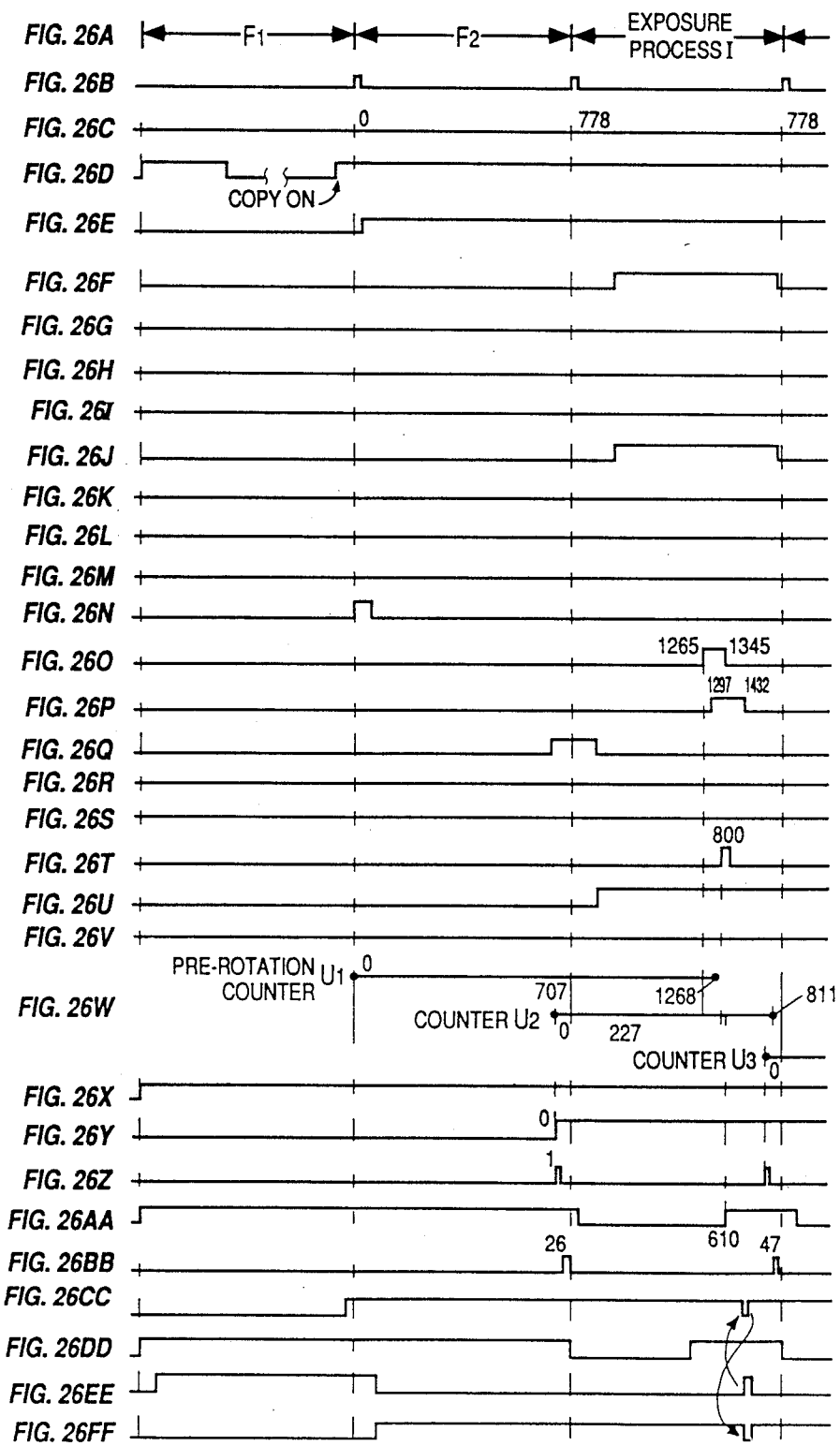
FIGS. 26A to 26F and FIGS. 27A to 27FF are timing charts for explaining a color recording operation.
Figure 27:
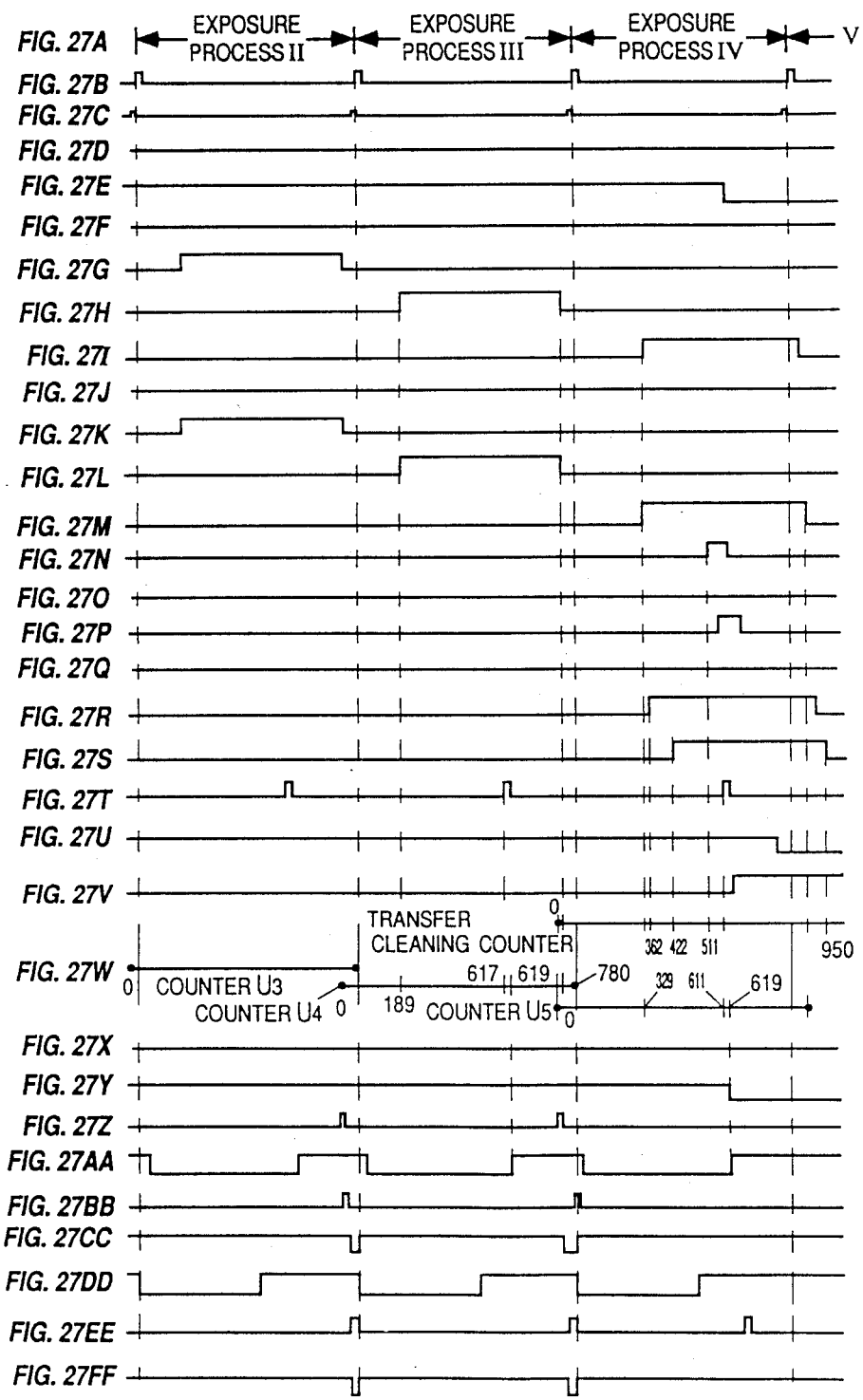

The first control unit 107 will be described. FIG. 25 is a block diagram showing an arrangement of input and output systems with respect to a color copying machine. A first microcomputer 117 controls a color image processing system as a whole. An operation/display unit 118 is used to input various input data such as magnification designation data, data for designating a recording position, and data for designating a recording color and display the input data contents and the like. The display means comprises display elements such as LEDs.

A paper size detector 119 detects a size of cassette sheets stacked in a tray to indicate the detected paper size and to automatically select a paper size corresponding to the document size.

A drum index sensor 127 detects an angular position of the image forming body 42, and the index signal from the drum index sensor 127 controls photoelectric processing timings.

A cassette paper-zero sensor 128 detects whether the number of sheets in the cassette is zero. A manual feed paper-zero sensor 130 detects the presence/absence of a sheet manually fed in the manual feed mode.

A toner density sensor 129 detects a toner density on the drum 11 or after fixing.

Four toner remaining amount sensors 131 to 134 detect remaining amounts of toners in the developing units 43 to 46, respectively. When toner replenishment is required, indicator elements for toner replenishment arranged on the operation unit are controlled to be turned on.

A temporary stop sensor 135 is arranged to detect that a sheet is properly fed to second paper feed rollers (not shown) during use of the color copying machine.

An exhaust sensor 136 detects whether the fixed sheet is properly exhausted outside the copying machine. The exhaust sensor 136 has a function opposite to that of the temporary stop sensor 135.

A manual feed sensor 137 is used to detect whether a manual feed tray is set. If the manual feed tray is set, the manual feed mode is automatically set.

Outputs from the respective sensors described above are fetched by the first microcomputer 117, and necessary data are displayed on the operation/display unit 118, or the drive state of the color copying machine is controlled as needed.

In the color copying machine, in addition to a motor 138 for developing the yellow, magenta, and cyan components, a motor 139 for the black component is arranged. These motors 138 and 139 are controlled by command signals from the first microcomputer 117. Similarly, a drive state of a main motor (drum motor) 120 is controlled by a PLL motor driver 121. The drive state of the driver 121 is controlled by a control signal from the first microcomputer 117.

During color development, a predetermined high voltage must be applied to the developing unit in operation. For this reason, the charging high-voltage source as the charger 140, a developing high-voltage power source 141, a transfer.separation high-voltage power source 142, and a toner reception high-voltage power source 143 are arranged, and predetermined high voltages are applied thereto as needed.

Reference numeral 145 denotes a cleaning roller driver; 146, a first paper feed roller driver; and 147, a second paper feed roller driver. Reference numeral 144 denotes a cleaning ON/OFF motor. Reference numeral 148 denotes a separation pawl driver.

The second paper feed rollers are used to convey the sheet conveyed by the first paper feed rollers to a latent image formed on the image forming body 42.

A fixing heater 124 is controlled by a fixing heater ON/OFF circuit 123 in response to a control signal from the first microcomputer 117.

A fixing temperature is read by a thermistor 125 and is controlled by the first microcomputer 117 to be normally controlled to be an optimal temperature.

Reference numeral 122 denotes a clock circuit (about 12 MHz).

A nonvolatile memory 126 serving as a backup memory of the first microcomputer 117 is used to store data even after a power switch is turned off. For example, a total counter data, an initial value, and the like are stored in this backup memory.

Various control operations required for color image processing are performed by the first and second microcomputers 117 and 109 in accordance with predetermined sequences.

A series of operations in color recording will be described with reference to FIGS. 26A to 26FF to FIGS. 27A to 27FF. In this embodiment, in addition to a full-color (yellow, magenta, cyan, and black) recording, single-color recording designated by an external signal can also be performed. First, full-color recording will be described in detail with reference to FIGS. 26A to 26FF to FIGS. 27A to 27FF.

Referring to FIG. 26A, an interval F1 represents an interval from a turn-on operation of a main power switch of the apparatus to depression of a copy button. An interval F2 is an interval of pre-rotation processing of an image forming body (to be also referred to as a drum hereinafter).

An exposure process interval I is a yellow development (recording) interval. Referring to FIG. 27A, an exposure process interval II is a magenta development interval, an exposure process interval III is a black development interval, an exposure process interval IV is a cyan development interval, and an interval V is a post-rotation interval.

Numerals indicated in FIGS. 26A to 27FF are count values of the drum counter, and count values of other counters such as a pre-rotation counter.

Figure 28:
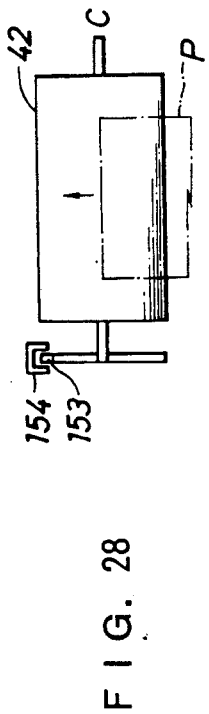
FIG. 28 is a view for explaining an index sensor.

When the main power switch is turned on, the main motor 120 is rotated for a predetermined interval. When a copy button is depressed, the main motor is rotated (FIG. 26D). As shown in FIG. 28, when an index sensor 154 detects a V-shaped index element 153 mounted on the image forming body 42, the drum counter is cleared (FIGS. 26B and 26C). The subsequent operations are performed on the basis of the count value of the drum counter. The exposure process (time) intervals I to V are equal to each other. In this embodiment, the image forming body 42 is rotated by one revolution when the count value reaches 778.

In the pre-rotation interval F2, the pre-rotation lamp is turned on from an intermediate point of the interval and is kept on for a predetermined interval (up to the intermediate point of the yellow development interval I), and preprocessing of color development is executed.

When the yellow to cyan development intervals are performed, the magnetic rollers 43c and the developing sleeves 43b arranged in the developing units 43 to 46 are rotated during the corresponding intervals, and the developing bias voltages rise in synchronism with these rotational timings (FIGS. 26F to 26M and FIGS. 27F to 27M).

The cleaning blade 47a is brought into tight contact with the image forming body 42 in synchronism with a leading edge of the drum index signal in the pre-rotation interval F2, and the toner attached to the image forming body 42 is removed (FIG. 26N). The cleaning blade 47a is separated from the image forming body 42 upon one revolution of the image forming body 42 (FIG. 26O). Some toner particles are left on the image forming body 42 after this toner removal or may be scattered during blade release. Therefore, the cleaning roller starts operations after a lapse of a short period upon release of the blade. In this manner, the residual toner removal operation is performed (FIG. 26P).

The first paper feed rollers are rotated prior to the yellow development interval I to convey the recording sheet to the second paper feed rollers (FIG. 26Q). The first paper feed rollers are arranged to convey a cut sheet. The sheet conveyed by the first paper feed rollers is conveyed in the image forming body 42 upon driving of the second paper feed rollers. The convey timing (FIG. 26R) of this sheet is given in the last exposure process interval (exposure process IV in FIG. 27A).

A paper feed operation by the first paper feed rollers is stopped when the recording sheet reaches the temporary stop sensor arranged immediately in front of the second paper feed rollers. When the second feed rollers are driven to cause the recording sheet to pass by the temporary stop sensor, an output from the temporary stop sensor becomes zero (FIG. 27U).

A transfer operation is performed upon driving of the first paper feed rollers after a lapse of a short period of time. In synchronism with the transfer operation, in order to prevent the sheet from being wound around the image forming body 42 during transfer, a predetermined AC voltage is applied to a sheet separation electrode (FIG. 27S).

When the output from the temporary stop sensor 135 falls, development and fixing operations are completed. The paper exhaust sensor 136 detects an exhaust state of the sheet after fixing (FIG. 27V).

In color recording, a toner density is detected every developing operation. Density detection timings are determined by count values of the yellow to cyan detection counters (U2 to U5 in FIGS. 26W and 27W). These counters are set with reference to write timings of the density detection patch. The yellow counter is reset when the count value of the drum counter is 706. When the count value reaches 602 after resetting, the toner density is detected.

The magenta counter is reset when its count value is 707. The black and cyan counters are reset when their count value is also 707.

The toner density is detected by referring to a specific image area. For this reason, a density detection patch signal (e.g., an image signal corresponding to an image area having a size of $8 \times 16$ mm) shown in FIGS. 26BB and 27BB is utilized. When a predetermined period of time has elapsed after generation of the patch signal, a toner density detection signal (FIGS. 26T and 27T) is output, and an image density of the specific area is detected.

The pre-rotation counter is cleared at time when the first drum index signal is input upon a copy-on operation. When the count value of the pre-rotation counter reaches 1,266, the pre-rotation processing is completed (U1 in FIG. 26W).

When the main power switch is turned on, the motor for driving the polygonal mirror of the deflector 41 is simultaneously driven. Therefore, the polygonal mirror is always rotated at a predetermined speed (FIGS. 26X and 27X).

Image data necessary for image recording are output at the following timings. When a video gate is set at "1" in synchronism with the yellow counter. The video gate is set at "0" in synchronism with the end of cyan laser write operation (FIGS. 26Y and 27Y). The image data is sent to the image output unit 27 during the "1" period of the video gate.

The vertical valid signal V-VALID is output such that it becomes valid during a predetermined period of time (period during which the count value reaches 528 for an A4 recording sheet) in each development processing step (FIGS. 26AA and 27AA).

A copy signal is output from a controller in the image processing output unit 27 (FIGS. 26CC and 27CC). At the same time, a start signal for optical scan is output. The optical scan signal is an active low signal which is enabled at its trailing edge (FIGS. 26DD and 27DD).

When the movable mirror unit having a light source as a component of the image reading means is moved in the image reading unit B, a home position signal representing a home position of this optical system is output to the control circuit of the image output unit 27 every development processing step (FIGS. 26EE and 27EE).

When the home position signal is received and the next exposure process is to be performed, the copy R signal (FIGS. 26CC and 27CC) is output (FIGS. 26FF and 27FF).

The above operations for performing multicolor recording are schematically represented by the timing charts.

When an original image is recorded with an externally designated color (only one color), image processing associated with the designated color is executed. Other color image processing steps are not executed.

A description of the operations of the single-color image processing steps will be omitted.

Figure 29:
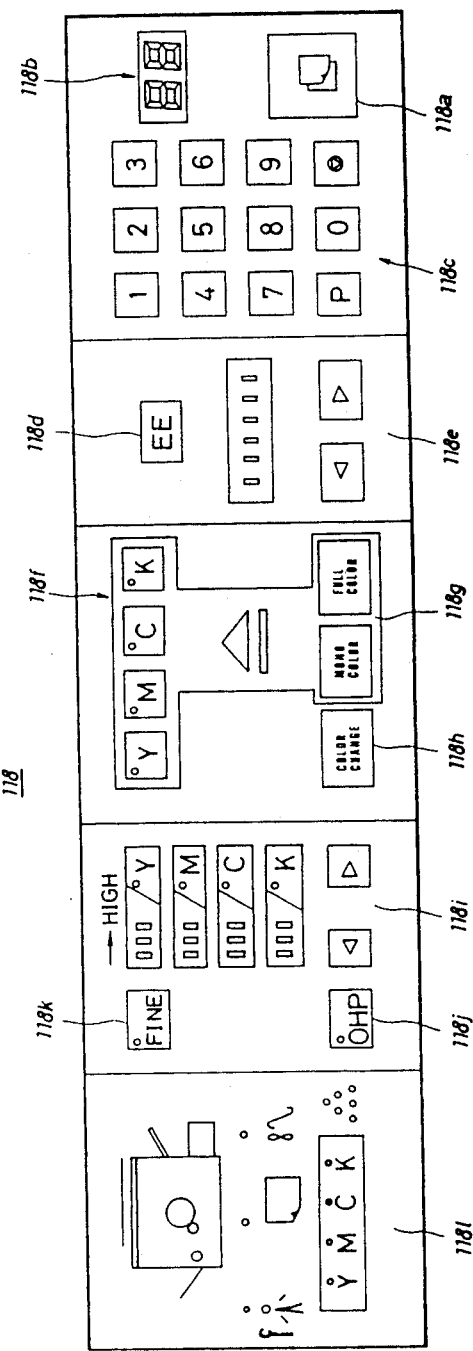
FIG. 29 is a plan view showing a key layout state of an operation/display unit.

The operation/display unit 118 of the apparatus will be described with reference to FIG. 29.

Reference numeral 118a denotes a copy switch. When the switch 118a is depressed, a copy operation is performed in the sequence described above. LEDs are arranged below this switch. When a read LED is kept on, it indicates a warming-up state. When a green LED is turned on, a ready state is set.

Reference numeral 118b denotes a display section for displaying the number of copies, a self-diagnosis mode, an abnormal state, and its position. The display section 118*b* comprises 7-segment LEDs to display the contents by numerical values.

Reference numeral 118*c* denotes keys for setting the number of copies, designating the self-diagnosis mode, interrupting the copy operation, and clearing the preset number of copies. For example, when the power switch is turned on while numeric keys "4" and "7" are kept depressed, the self-diagnosis mode is set. At this time, when a specific number is input, it is possible to independently rotate a motor of the red developing unit. In this mode, when a specific number is input or when the apparatus can be powered without depressing any key after the apparatus is deenergized, the normal mode can be restored.

In the normal mode, a normal copy operation can be performed. In this case, by combining numeric keys and the P button, data print-out, test pattern print-out, and the like can be performed. For example, a printer controller is connected to the second interface, and "52P" is input. Under these conditions, when the copy button is depressed, data from the printer controller can be output.

Similarly, "53P" is input, the test pattern can be printed out. When a stop/clear key is depressed during yellow development of four-color copying, the post-rotation process is started when yellow development is completed. The initial state is restored when the post-rotation process is completed. This applies to a multiple copy operation.

Reference numeral 118*d* denotes an EE mode cancel key. When the key 118*d* is depressed to cancel the EE mode, keys 118*e* and 118*i* are selectively depressed to manually set threshold values.

The keys 118*e* are used to set a threshold level of the one-frame image. When the left key is depressed, a lower threshold value is selected. Upon depression of this key once, the threshold value is discretely changed from the normal threshold value to the next value. The right key is used to perform an operation opposite to the left key. Since the yellow, magenta, cyan, and black are normally different in densities. The keys 118*i* are selectively used to determine threshold values in units of colors.

The keys 118*i* are used to independently determine threshold values in units of colors as described above. For example, the yellow switch is depressed to change a yellow threshold value. In this case, an LED in this key is turned on, and the middle LED in a level meter flickers. In order to set a desired threshold value, the left or right one of the keys 118*e* is depressed to change the level by one level. When a desired level is to be set, the yellow switch is depressed again, and the level is set to a level represented by the flickering LED. When the desired level is set, the LED stops flickering and is turned on. The operations for red and black threshold values can be performed as described above.

Color copy modes includes one-, two-, and three-color modes and a full-color mode. These modes are designated by keys 118*f* and 118*g*. The operations of these keys will be described below.

In the one-color recording mode, the monochromatic key (MONO COLOR) key is depressed. When a designated color is yellow, the yellow key of the keys 118*f* is depressed. When an image is recorded with black, the black key of the keys 118*f* is depressed. The same operations as described above are performed when an image is recorded with magenta or cyan. In the four-color recording mode, a full-color key of the keys 118*g* is depressed. When the copy key 118*a* is depressed, four-color recording is performed in an order of yellow, magenta, black, and cyan.

An OHP key 118*j* is used to prepare an OHP sheet by using a transparent film. In this case, a fixing temperature is about 200° C. due to the following reason. The fixing temperature is increased to melt a toner on the film to improve smoothness of the toner surface layer and improve transparency.

A fine mode key 118*k* is used when a laser power is set to be 1 to 2 mW lower than the normal power of 5 mW so as to improve character reproducibility. In this mode, the key 118*k* is effectively used after the MTF correction is considerably emphasized.

LED elements 118*l* indicate operating states of the copying machine (jam, sheet replenishment, and moving position of the sheet) and toner replenishment.

In the above embodiment, the image is read with red, blue, and green, and image, processing and its output are performed by using yellow, magenta, cyan, and black. However, the present invention is not limited to the above combinations. Other colors may be used, and the number of colors is not limited to the above case but can vary to obtain the same effects as described above.

According to the present invention as has been described above, the color code is output during color correction in addition to the Y, M, C, and K density data. Color ghost correction is performed on the basis of the color code to eliminate the color ghost. At the same time, a density of a black line is increased. Therefore, there is provided a simple color image processing system capable of performing color ghost correction and reproducing, with high quality, a black character or the like included in a color image.

What we claim is:

1. An image processing apparatus, comprising:
   color data forming means for forming color data for each pixel, said color data representing one of a chromatic color, an achromatic color and a background color on the basis of original color image information; and
   color ghost correction means for changing the color data of a pixel when a serial arrangement of color data of a plurality of successive pixels including said pixel coincides with one of a plurality of predetermined patterns.

2. An image processing apparatus, comprising:
   image data forming means for forming for each pixel, on the basis of original color image information, an image data including both (a) a plurality of density data each of which consists of plural bits, aid plurality of density data corresponding to a plurality of colors including an achromatic color and (b) a color data representing one of a chromatic color, an achromatic color and a background color, and for outputting the color data and density data as parallel data;
   density data selection means responsive to an external color designation signal for selecting density data corresponding to one of a plurality of colors designated by the external color designation signal from said image data; and
   color ghost correction means for changing the color data of a particular pixel and correcting the density data selected by said density selection means when a serial arrangement of the color data of a plurality of successive pixels including said particular pixel coincides with one of a plurality of predetermined patterns.

3. The apparatus of claim 2, further comprising image input means for inputting blue, green, and red color components of an original color image information as parallel data into said image data forming means; wherein said density data are adapted to be addressed by said color components of the original color image, and correspond to yellow, magenta, cyan, and black colors.

4. The apparatus of claim 3, wherein, when a serial arrangement of the color data of a plurality of successive pixels including said particular pixel coincides with one of a plurality of predetermined patterns, said color ghost correction means corrects the density data selected by said density data selection means so as to become zero when the selected density data corresponds to yellow, magenta or cyan color, or to increase when the selected density data corresponds to a black color.

5. The apparatus of claim 2, wherein said color ghost correction means includes means for outputting density data corresponding to a color conforming with said color designation signal to produce a recording image signal for recording an image in said color conforming with said color designation signal.

6. The apparatus of claim 2, wherein said original color image information is obtained by splitting an image beam from an original image into a plurality of color components and focusing them, respectively, on separate photoelectric conversion elements.

* * * * *